US012673271B2

(12) United States Patent
Chi et al.

(10) Patent No.: US 12,673,271 B2
(45) Date of Patent: Jul. 7, 2026

(54) INTELLIGENT GAMING ASSISTANT FOR PERSONAL WELLNESS

(71) Applicant: Dell Products L.P., Round Rock, TX (US)

(72) Inventors: Wei-Hsiang Chi, Taipei (TW); Preeth Kartikeyan Srinivasan, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 334 days.

(21) Appl. No.: 18/351,446

(22) Filed: Jul. 12, 2023

(65) Prior Publication Data

US 2025/0018309 A1 Jan. 16, 2025

(51) Int. Cl.
*A63F 13/85* (2014.01)
*A63F 13/285* (2014.01)
*A63F 13/79* (2014.01)

(52) U.S. Cl.
CPC ............ *A63F 13/85* (2014.09); *A63F 13/285* (2014.09); *A63F 13/79* (2014.09)

(58) Field of Classification Search
CPC ........ A63F 13/85; A63F 13/285; A63F 13/79; A63F 13/212
See application file for complete search history.

(56) References Cited

U.S. PATENT DOCUMENTS

| | | | | |
|---|---|---|---|---|
| 2013/0116022 A1* | 5/2013 | Davison | ................ | A63F 13/355 |
| | | | | 463/9 |
| 2017/0346820 A1* | 11/2017 | Valla | ........................ | H04L 67/52 |
| 2019/0291011 A1* | 9/2019 | Benedetto | ............... | A63F 13/30 |
| 2021/0373676 A1* | 12/2021 | Jorasch | ................. | A63F 13/215 |

* cited by examiner

*Primary Examiner* — Kevin Y Kim
(74) *Attorney, Agent, or Firm* — Norton Rose Fulbright US LLP

(57) ABSTRACT

Systems and methods for providing wellness assistance to a user during a gaming session are disclosed. Telemetry data associated with a user is received, e.g., by an information handling system or hub device, during a gaming session for a gaming application. A wellness level of the user is monitored during the gaming session, based, at least in part, on the telemetry data. Upon determining, based on the monitoring, that the user needs wellness assistance during a portion of the gaming session, a wellness assistance session is initiated to provide the wellness assistance via at least one interface of a device associated with the user.

20 Claims, 11 Drawing Sheets

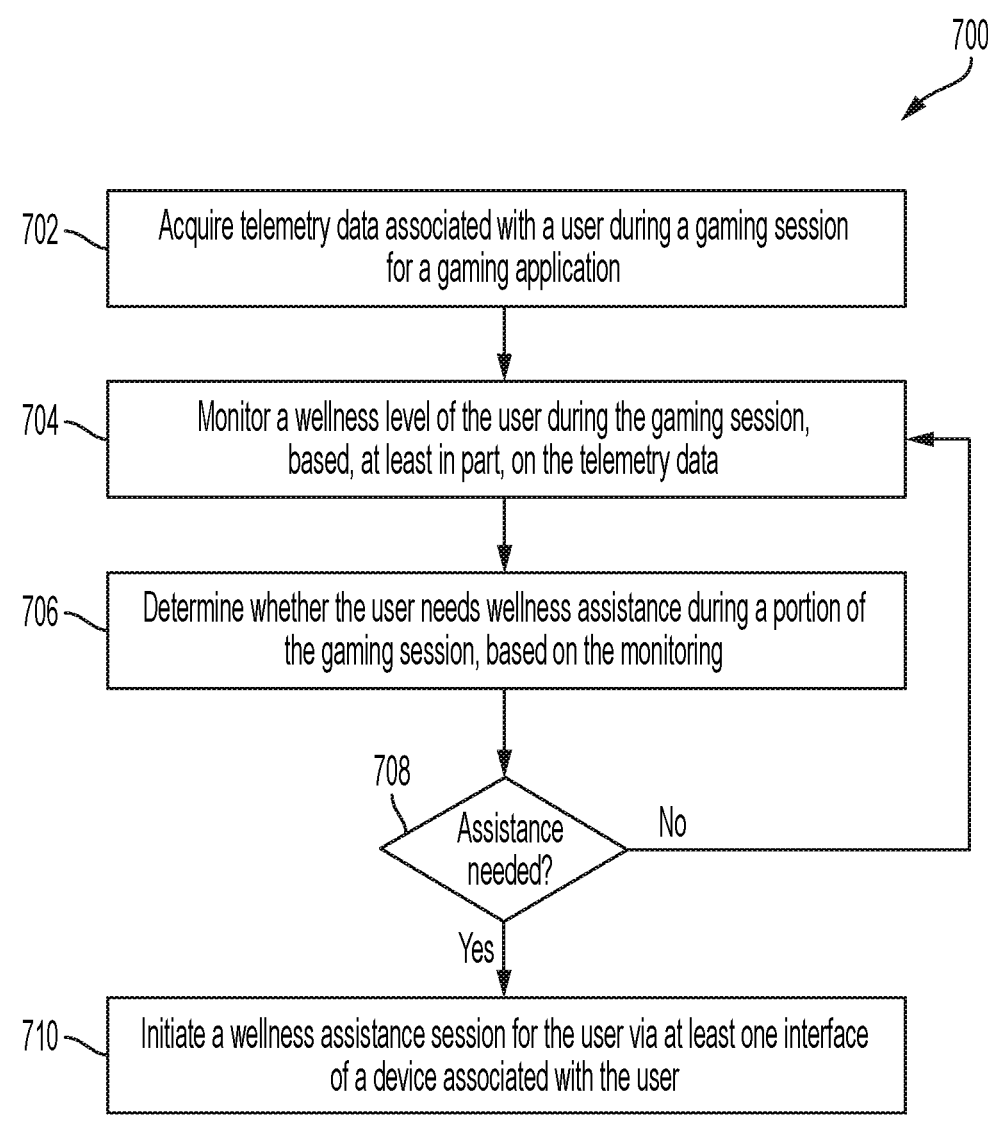

*700*

702 — Acquire telemetry data associated with a user during a gaming session for a gaming application 704 — Monitor a wellness level of the user during the gaming session, based, at least in part, on the telemetry data 706 — Determine whether the user needs wellness assistance during a portion of the gaming session, based on the monitoring 708 — Assistance needed?

No

Yes

710 — Initiate a wellness assistance session for the user via at least one interface of a device associated with the user

| Scenario | Session data | Biometric data | AI engine | Personal wellness assistance |
|---|---|---|---|---|
| User playing games | Playing for 5hrs at living room | | | Suggest that the user take a break with lighting and haptic feedback via the controller |
| User playing games | Playing for >15min Living room at standing-height | | AI has learned where the sofa is | Suggest that the user take a seat via OSD message and direct the user to the sofa via controller lighting |
| User turned on the gaming APP | Wed night | Tiredness detected thru voice and heart rate | | Suggest a relaxing game for the user to play; display health tips for the user when the screen is idle (e.g., between gaming sessions) |

| Scenario | Biometric data | Session and relationship data | AI engine | Personal Wellness Assistance |
|---|---|---|---|---|
| Wellness indication | 1st user's heart rate recorded | 1st user play often, with time, duration, relationship data recorded. Age and gender data available | 1st user's heart rate pattern is analyzed by AI based on the Gaming Cloud big data | • Indicate 1st user's cardio health score on mobileApp<br>• Provide health tips/warnings if abnormal heart rate observed<br>  • Ex: extremely high rate at combat game<br>  • Use controller lighting/haptics as a reminder to take rest/slowdown<br>• Rewards can be provided in different forms when advices are taken |
| Take a break | 1st user's location at living room detected | 1st and 2nd users have played for really long hours | AI has learned where the living room seats are. Game content analyzed to determine the best timing for providing assistance | • Determine if a bio break needed<br>  • Use OSD, controller lighting/haptics as reminders<br>• Determine if seats guide required<br>• Optionally inform the parents based on parental settings |
| Good company | Tiredness detected thru heart rate, voice, etc | 1st user playing at late night of a work day | AI knows 1st user's preference on games | • Suggest more relax gaming options<br>  • Shorter period; less competitive<br>  • Show health tips between games |

| Scenario | Time info | Location info | Biometric data | AI engine | Personal Wellness Assistance |
|---|---|---|---|---|---|
| User playing games | Playing for >15min | living room standing-height | | AI has learned where the sofa is | Suggest a player to sit with an OSD message, and guide with light ring to where the sofa is |
| User playing games | Playing for >60min | living room | Fast heart rate; sweaty hands | | Suggest a player to take a bio-break; Trigger controller lighting and haptic feedback |
| User turned on the gaming APP | Wed night | Book room | | | Prompt a relax game at the beginning Show health tips between games |
| User playing games | Thursday morning | Kids room | | User rarely play on Thursday morning | Prompt a new game promotion |
| Before Friday night | | | | Family members sometimes game on Friday night | Remind to have another game night on Friday (with phone APP, TV, etc) |
| Before weekend | | | | Kiddo sometimes plays racing games on his own | Recommend a multi-user racing game to the parents |
| Family playing shooting games | Playing for >10min | living room | Kiddo's heart rate is high | Kiddo losses for 3 times in a row | Recommend a collaboration type of game instead of a competing one |
| Single gamer playing | Playing for >30min in the weekend | living room | | Multiple game controllers detected | Prompt the most popular family game for consideration |

FIG. 10

INTELLIGENT GAMING ASSISTANT FOR PERSONAL WELLNESS

FIELD OF THE DISCLOSURE

The instant disclosure relates to information handling systems. More specifically, portions of this disclosure relate to an information handling system for assisting users of video game applications (or gamers) with their personal wellness.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One increasingly popular use for information handling systems is gaming. Information handling systems can be utilized by users to execute a variety of gaming applications, such as strategy games, adventure games, first person shooter games, racing games, sports games, simulation games, role playing games, platformer games and other games. Gaming applications may range in difficulty from easy to learn by a non-gamer to difficult even for veteran gamers.

Oftentimes, when a user encounters a particularly difficult segment of a game or wishes to improve their skills, the user may consult online videos, written strategy guides, forums, message boards, friends, and other information sources for tips, strategies, and other assistance related to improving their skills with respect to a particular game. Such information sources, however, are seldom used by gamers for their own personal wellness. Moreover, some gamers may participate in extended gaming sessions that last several hours without taking their personal well-being into account, for example, by taking regular breaks to rest their eyes or managing their stress or excitement levels before bedtime.

Shortcomings mentioned here are only representative and are included simply to highlight that a need exists for improved information handling systems. Embodiments described herein address certain shortcomings but not necessarily each and every one described here or known in the art. Furthermore, embodiments described herein may present other benefits than, and be used in other applications than, those of the shortcomings described above.

SUMMARY

Information handling systems may be used to execute applications, such as gaming applications. Embodiments of this disclosure may be used to provide an information handling system, such as a hub device, which uses artificial intelligence (AI) to provide assistance with a user's personal wellness during an application session. The application session may be a gaming session of the user with a gaming application executed by the information handling system or hub device. Gaming applications may include any of various single-player or multi-player games, such as puzzle games, role playing games, adventure games, first person shooter games, sports games, simulation games, strategy games, platformer games, and other games. Such games may be hosted by the information handling system to support different types of gameplay in one or more gaming environments, such as one or more rooms of a household for gameplay in a family environment or a cloud-based gaming environment for online gameplay.

In some embodiments, the information handling system or hub device may include an intelligent personal wellness assistance service (e.g., an automated wellness assistant or wellness coach) that analyzes telemetry data acquired from various sources to monitor the user's personal wellness during the gaming session and provide appropriate assistance or feedback, e.g., to encourage the user to take appropriate action for their personal well-being. In some embodiments, the telemetry data may include or correspond to session data, biometric data, and relationship data. The session data may indicate one or more gaming characteristics of the user that may affect the user's state of health or wellness (such as the user's age, skill or experience level, preferred gaming time, and duration of each gaming session). The biometric data (also referred to herein as "wellness data") may indicate one or more physiological characteristics of the user, such as the user's level of stress during the gaming session. The biometric data associated with the user may include various measurements (e.g., heart rate, skin temperature, skin moisture or perspiration, etc.) collected by different sensors or measurement devices that are coupled to or integrated with a peripheral device, such as a wireless game controller, of the user during the gaming session. Such sensors may include, for example, one or more motion sensors (e.g., one or more of a gyroscope and an accelerometer), a heart rate sensor, a temperature sensor, a moisture sensor, a microphone, a fingerprint sensor (for user identification), and one or more location sensors or devices. The relationship data may include, for example, information connecting the user with one or more other users associated with one or more gaming environments (e.g., one or more rooms within the user's house). Such other users may be, for example, other family members who are also gamers residing in the same household as the user. In some implementations, the relationship data may be determined based on the session data associated with one or more of the users. For example, the session data associated with a first user may indicate one or more interactions between the first user and a second user, which may then be used to determine a relationship between the first and second users.

In some embodiments, the wellness assistance service of the information handling system may include an AI engine that analyzes the telemetry data along with information relating to a gaming context of the gaming application to monitor the user's level of health or personal wellness during the gaming session. Based on the monitoring, the AI engine may determine whether the user needs wellness assistance during at least a portion of the gaming session, such as while playing a particularly challenging stage of the game. The assistance may be provided in various ways, such as through in-game assistance via an on-screen display, through an interface of a gaming companion application executable at a mobile device of the user, or through controller feedback via a haptic or lighting interface of the user's game controller or other peripheral device, or through any combination of the foregoing interfaces. The type of assistance provided to the user during the session may depend on a gaming context associated with the gaming application. The gaming context may be based on the type of gaming application (e.g., single-player vs. multi-player game) and the type of gaming environment (e.g., a family environment with gamers located in the same household vs. a cloud environment with online gamers in different remote locations). In some embodiments, the AI engine may employ a machine learning model for the data analysis and wellness monitoring operations. The machine learning model may be trained to assess the user's gaming performance and wellness levels based on session history data collected over time during previous gaming sessions of the user or other users with similar gaming profiles (or both) for the gaming application. The AI engine may also incorporate user feedback to evaluate the effectiveness of the assistance and retrain the model if necessary to improve the assistance to be provided during subsequent gaming sessions based on the user's particular gaming characteristics and level of health or wellness.

In some embodiments, the aspects described herein may be used to support the execution of gaming applications in different environments. Gaming sessions may execute on a service, either locally on a device, on another system on the network, or in the cloud. A device may access the gaming session by executing an application that communicates with the service to receive and transmit user input to the service and provide feedback to the user from the service. The device may include its own audio/visual (AV) output for displaying a graphical user interface and/or a rendered display from the gaming session. Different environments at a location may include different AV systems, and the device may be automatically paired with an AV system and may be reconfigured to support interaction with an application session using the paired AV system.

A user's home is one example location that may have multiple environments, such as a living room, a dining room, a study, and/or a bedroom, each with different screen configurations, speaker configurations, and/or network availability. Aspects of embodiments disclosed herein may provide a system that enables game play from a set of candidate game hosts and environments to consumption devices of a user's choice while the user moves about their home between the different environments. The system may employ methods to determine where a user is located within the home, availability and selection of candidate game hosting and target environments, homing and direction of related I/O, and/or AV for consumption. The system then migrates the user and their information to the determined environment by coordinating gameplay by the user. The solution accommodates multiple users simultaneously within the home, whether in single player, multiplayer using the same screen, or multiplayer using separate screen games. The solution may configure AV and input/output (I/O) such that multiple users can consume one or multiple games in the home simultaneously, whether in separate locations or when seated together in front of the same consumption device, e.g., a large television, where multiple games might be hosted simultaneously.

The mobility of a user between services and applications for executing an application session may be supported by an information handling system that uses available telemetry from multiple sources to build a confidence-based knowledge graph of the user's gaming environments and determine a position of the user within that graph. A system with knowledge of devices in a user's gaming environment may build a knowledge graph by aggregating and comparing telemetry. For example, network telemetry may reveal that devices are positioned relatively near each other, a mobile device may reveal an absolute location based on GPS data, and/or an infrared presence sensor may reveal that the user is sitting in front a device. An intelligent system may assemble these individual pieces of telemetry into a broader knowledge graph based on the absolute and/or relative locations of the user's devices, the location of the user in relation, and or characteristics of the devices. This knowledge graph may be updated in real time and/or based on changes in device telemetry.

While embodiments of the disclosed wellness assistance techniques are described in the context of users of gaming applications, it should be appreciated that these techniques may be applied to general computer users and extended to applications beyond gaming. For example, wellness assistance may be provided to a user of a desktop or mobile computing device (such as a laptop) based on telemetry data acquired using various sensors embedded in or near I/O devices of the computing device (such as in a palm rest adjacent to a touchpad or keyboard of the laptop). Such sensors may include, but are not limited to, a heart rate monitor, one or more motion sensors, a camera, and a microphone. The data captured using such sensors (e.g., heart rate data) may be combined with visual and audio input data analysis techniques (such as key stroke analysis, analysis of pupil dilation, and voice modulation analysis) to gauge the user's excitement or stress levels (e.g., based on key stroke frequency, pupil dilation, and breathing patterns). This sensory data may be further combined with other personal data, such as health data accumulated with the user's consent, to determine whether the user may be experiencing high stress levels during a portion of the application session and to provide relevant feedback accordingly. The feedback may include, for example, wellness tips or suggestions (or links to online wellness resources). Such feedback may be provided in real time during the application session, e.g., via a pop-up window displayed within a graphical user interface of the application, or via email or other messaging interface after the session. The application in this example may be an office or work-related application, such as a spreadsheet editor or meeting presentation program.

According to one embodiment, a method for execution by an information handling system, such as a hub device, includes receiving, by the hub device, telemetry data associated with a user during a gaming session for a gaming application executing on the hub device. The method may also include monitoring, by the hub device, a wellness level of the user during the gaming session, based, at least in part, on the telemetry data. The method may further include determining that the user needs wellness assistance during a portion of the gaming session, based on the monitoring and initiating a wellness assistance session to provide the wellness assistance via at least one interface of a device associated with the user, based on the determination.

In certain embodiments, the telemetry data includes session data and biometric data associated with the user, where the session data is indicative of one or more gaming characteristics of the user during the gaming session, and where the biometric data is indicative of a stress level of the user during the gaming session.

In some embodiments, the session data may indicate that an age of the user is below a minimum threshold age, and the telemetry data may further include relationship data identifying one or more designated contacts related to the user. Furthermore, initiating the wellness assistance session may include transmitting a recommendation for the wellness assistance to one or more corresponding devices of the one or more designated contacts.

In some embodiments, determining that the user needs the wellness assistance includes: determining whether the stress level of the user is above a threshold stress level; and determining that the user needs the wellness assistance when the stress level of the user is above the threshold stress level during the portion of the gaming session. In some implementations, the threshold stress level is based on an average stress level of others users associated with the gaming application.

In some embodiments, the at least one interface of the device associated with the user includes a display interface of a display device coupled to the hub device, and initiating the wellness assistance session includes: displaying a prompt via the display interface of the display device, the prompt requesting confirmation that the user needs the wellness assistance during the gaming session; receiving a response to the prompt from the device of the user; and initiating the wellness assistance session as an in-game assistance session via the display interface when the response includes the requested confirmation.

In some embodiments, the at least one interface of the device associated with the user further includes a haptic interface of a peripheral device coupled to the hub device, and initiating the wellness assistance session further includes triggering haptic feedback via the haptic interface of the peripheral device based on the received response. In some implementations, the peripheral device is a wireless game controller coupled to the hub device.

The method may be embedded in a computer-readable medium as computer program code comprising instructions that cause a processor to perform operations corresponding to the steps of the method. In some embodiments, the processor may be part of an information handling system including a first network adaptor configured to transmit data over a first network connection; and a processor coupled to the first network adaptor, and the memory.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

FIG. 7 is a flow diagram of an example method for providing wellness assistance to a user during a gaming session of a gaming application according to some embodiments of the disclosure.

FIG. 8 is a table including different examples of scenarios for providing wellness assistance to a user based on telemetry data received for the user during a gaming session according to some embodiments of the disclosure.

FIG. 9 is another table including additional examples of scenarios for providing wellness assistance to a user based on telemetry data received for the user during a gaming session according to some embodiments of the disclosure.

FIG. 10 is yet another table including further examples of scenarios for providing wellness assistance to a user based on telemetry data received for the user during a gaming session according to some embodiments of the disclosure.

DETAILED DESCRIPTION

Figure 1:
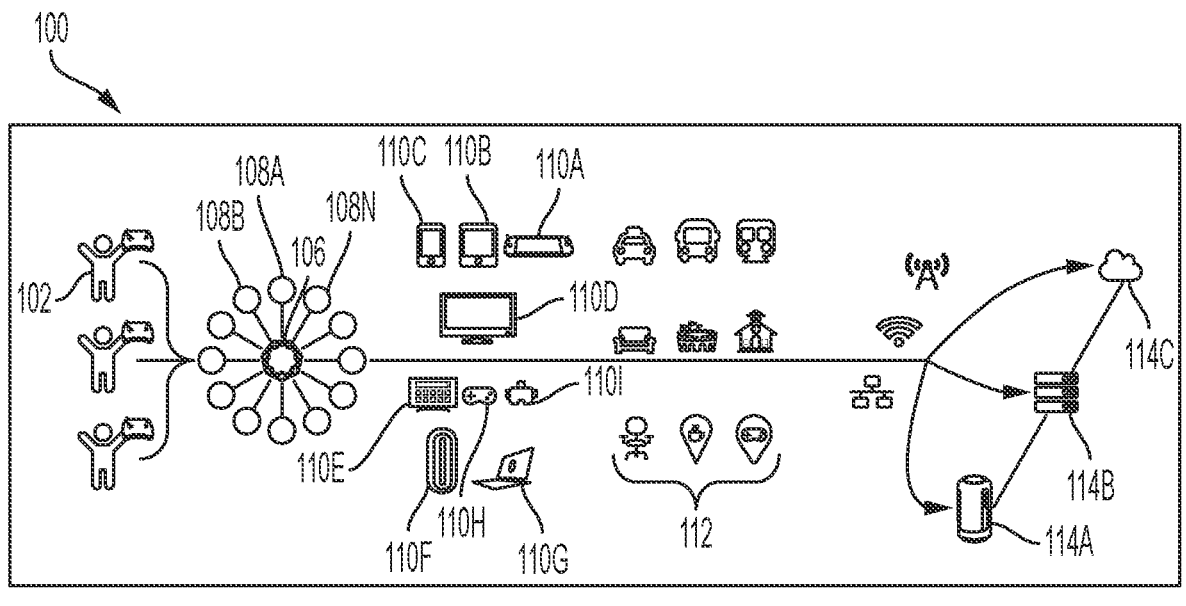
FIG. 1 is a block diagram illustrating aspects of a configurable system for providing various services to users according to some embodiments of the disclosure.

These example embodiments describe and illustrate various aspects of a configurable and dynamic gaming environment that can be supported through the use of a hub device, which may be an information handling system. A hub device may be located in a user's home and used to arrange game play sessions (or more generically application sessions) between host devices and services. The host devices may execute an application for receiving an AV stream for displaying rendered content from a game play session (or other application session), and in some configurations also receive user input for interacting with the session from a peripheral device, such as a gaming controller. The AV stream presented by the host device may be generated by a service. The service may execute on the hub device or another information handling system, such as a cloud computing resource. A home may include one or several host devices (e.g., televisions, mobile computers, tablet computers, and personal computers) and may include one or several information handling systems executing the service (e.g., a hub devices and personal computers).

The user's home may be divided into different gaming environments defined by a space around a host device. For example, a living room with a television may be one environment and a bedroom with a personal computer may be another environment. A user may use a peripheral device in one of the environments and the hub device may configure a host device, a service, and the peripheral device for operation in the environment by determining the corresponding environment using a knowledge graph. The knowledge graph provides a database of historical information about the environments from which the hub device may use current characteristics of the peripheral device to deduce the location, and thus current environment, of the peripheral device. For example, the knowledge graph may include information about location of rooms (e.g., environments) in the house based on wireless signatures of devices within the different rooms. This difference in signatures reflects that a device on a one side of the house may receive beacon signals from different neighboring access points than a device on an opposite side of the house. When a user carries the peripheral device around the house, the hub device may determine a location of the peripheral device based on visible access points to the peripheral device. Other example characteristics beyond wireless signature for determining location are described in further detail below, and the knowledge graph may be used to combine different characteristics to identify the location, and thus environment, of the peripheral device.

Based on the location of the peripheral device determined from the knowledge graph, the hub device may initialize an application session for the peripheral device by determining an appropriate host device and service for the application session. For example, if the peripheral device is in the living room and is requesting a game that is within the capabilities of the service on the hub device to execute, the hub device may initialize an application session for the peripheral device between the television as a consumption device and the hub device as a service. The service on the hub device executes the game and streams rendered content to an application executing on the television consumption device.

The hub device may be used to migrate the peripheral device to a different environment and/or migrate the application session between host devices and/or services. For example, initially the application session may use a communication link between the peripheral device and the television host device for receiving user input, in which the application executing on the television host device relays user input to the service through a backhaul communication link from the television host device to the hub device. During the application session, the hub device may monitor characteristics of the peripheral device, including signal strength of connection to other components, and determine that the communication link from the peripheral device to the hub device is stronger than the peripheral device to the television host device. The hub device may migrate the peripheral device to a communications link with the hub device such that the service executing on the hub device directly receives the user input but the streaming session continues from the service to the application executing on the television host device. Such a change is illustrated in the change in configuration from FIG. 3A to the configuration of FIG. 3B described in further detail below.

Other aspects of the application session may also be migrated. For example, if the peripheral device is determined to move to a different environment, then the hub device may migrate the application session to an application executing on a host device within the new environment. As another example, if a connection between the television host device and the service becomes unstable, the hub device may recommend and/or initiate a migration of the application session to a different host device. One scenario for such a migration may be where the television host device is connected through a wireless link to the service in which the wireless link quality is reducing quality of the streaming and a second host device with a wired connection is available in a nearby environment. Each of these example migrations may be determined based on information in the knowledge graph regarding locations of environments and capabilities within those environments. As yet another example, a user may request execution of an application, such as a particular game, during the application session for which a better configuration exists than the current host device and/or current service. The request for a different application, such as a game requiring a certain GPU capability, may cause the hub device to determine that a second device executing a second service is better for hosting the application and migrate the peripheral device to the second service by, for example, reconfiguring network connections.

The hub device may support connecting to multiple peripheral devices. In one example, the hub device may support two peripheral devices using a shared session on one host device to play the same or different games on the host device. In another example, the hub device may support two peripheral devices in different environments using different sessions with different host devices. The hub device may determine the environment of each of the peripheral devices based on characteristics of the device and the knowledge graph and configure application session for each of the peripheral devices accordingly. Different arrangements of peripherals and players may be supported. For example, one hub device executing a service and one host device executing an application can support a configuration with Game A and one player (P1) with peripheral (C1) and Game B and one player (P2) with peripheral (C2); or can support a configuration with Game A and one player (P1) with peripheral (C1) and Game A and one player (P2) with peripheral (C2); or can support a configuration with Game A and two players (P1, P2) with peripherals (C1, C2).

For purposes of this disclosure, an information handling system or hub device may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, handheld gaming system, console gaming system, hybrid gaming system, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

FIG. 1 is a block diagram illustrating aspects of a configurable system for providing services to users according some embodiments of the disclosure. A system 100 includes users 102 who may have access to a shared library of applications 106 including applications 108A-108N. The users 102 may have separate libraries, with some overlapping applications between the libraries. The users 102 may access the library 106 through devices 110A-I, such as mobile gaming device 110A, tablet computing device 110B, phone computing device 110C, television 110D, personal computing device 110E, desktop computing device 110F, laptop computing device 110G, game controller 110H, VR headset 110I. The devices 110 may access services at any of locations 112, including cars, busses, homes, hotels, offices, parks, etc. One or more of the devices 110 may communicate with an application session executing on a computing device 114, such as a home application hub 114A, a server 114B, or a cloud execution environment 114C. In some embodiments, environments may only exist for fixed devices, e.g., desktop computers, televisions, etc.

In some implementations, an application session, such as a gaming session of a gaming application, may execute on a service, either locally on a device, on another system on a network, or in the cloud. A device, such as one of devices 110A-I, may access the application session by executing an application that communicates with the service to receive and transmit user input to the service and provide feedback to the user from the service. It is noted that a portion (or entirety) of an application session for a multi-player gaming application accessed by a device associated with a user may be referred to as "a user session." The device may include its own audio/visual (AV) output for displaying a graphical user interface and/or a rendered display from the application session. Different environments at a location may include different AV systems, and the device may be automatically paired with an AV system and may be reconfigured to support interaction with an application session using the paired AV system.

Figure 2:
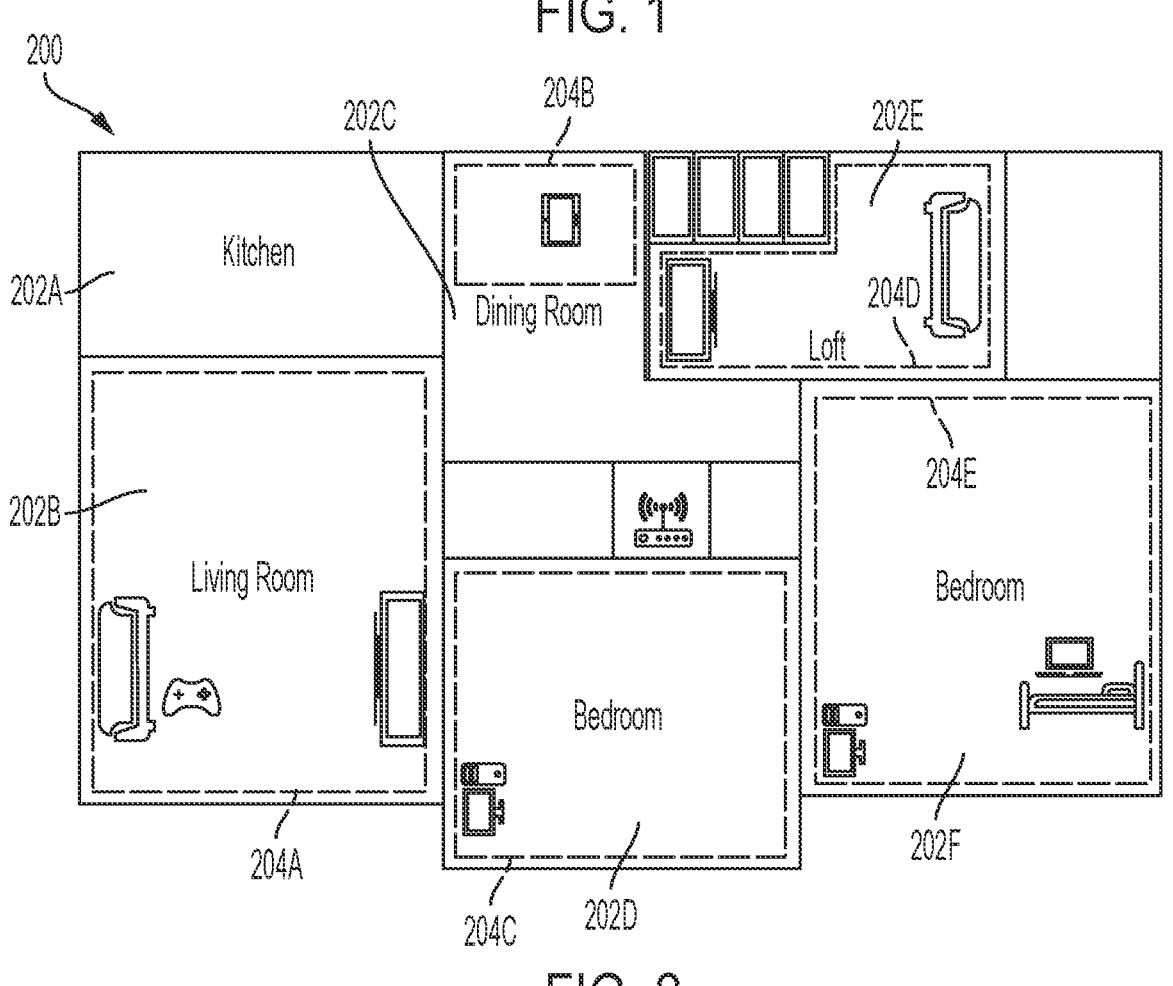
FIG. 2 is a block diagram illustrating possible gaming environments according to some embodiments of the disclosure.

FIG. 2 is a block diagram illustrating possible game environments according to some embodiments of the disclosure. A user's home 200 may include rooms 202A-F, and each of the rooms may have different information handling systems present, different AV equipment present, and/or different characteristics. For example, a living room 202B may include a large-size television, a bedroom 202D may include a personal computer, and a dining room 202C may include a table computing device. Gaming environments 204A-E in the home 200 may be defined based on spaces where a user is likely to execute an application session. Each gaming environment 204A-E may include numerous devices and gaming environments, devices that may or may not be capable of hosting games, and/or devices that may or may not be capable of receiving game output. A system 100 may allow multiple users in the home 200 to simultaneously execute an application session (e.g., a user session associated with each user). In some embodiments, multiple games may be hosted on a single device. In some embodiments, multiple games may target a single output device. In some embodiments, solution manages where games should be hosted, where game output should go, and how to best route peripheral I/O for users.

A user may move between gaming environments 204A-E within the home 200 and continue an application session. For example, a user may take a device, such as a gaming controller, from environment 204A to environment 204C. The gaming controller may migrate and reconfigure for operation in environment 204C from a configuration for environment 204A. For example, the controller may transition from an application hosted on a TV in living room 202B to an application hosted on TV in dining room 202C while remaining connected to a host service executing on a PC in bedroom 202D.

Figure 3A:
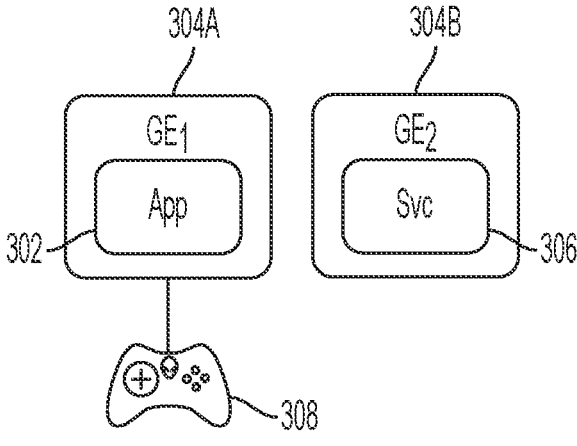
FIG. 3A is a block diagram illustrating an arrangement of applications and services hosted in different gaming environments according to some embodiments of the disclosure.

Example configurations for applications and services in gaming environments are shown in FIGS. 3A-3D. FIG. 3A is a block diagram illustrating application and services hosted in different gaming environments according to some embodiments of the disclosure. In FIG. 3A, a first gaming environment 304A may include a device, such as a TV or PC, hosting an application 302, which is an endpoint for an application session, such as a gaming session. The application 302 communicates with a service 306, which may be hosted on a device in a different gaming environment 304B. A controller 308 may communicate with the application 302 to receive user input for the application session to control, for example, a character in a game. In some embodiments, the controller 308 is connected to the environment 304A hosting the application and the I/O is configured to be relayed to the environment 304B hosting the actual game.

Figure 3B:
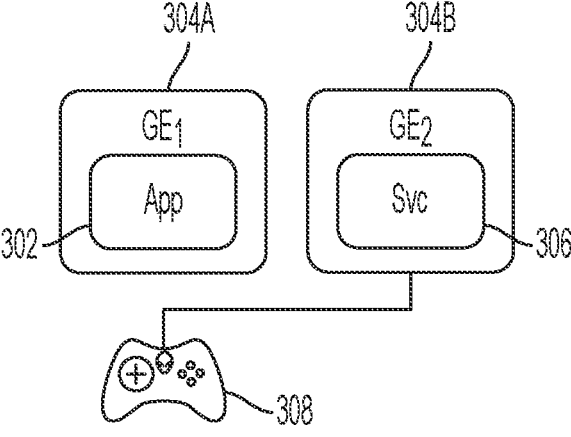
FIG. 3B is a block diagram illustrating another arrangement of applications and services hosted in different gaming environments according to some embodiments of the disclosure.

Another arrangement for the application and service is shown in FIG. 3B. FIG. 3B is a block diagram illustrating application and services hosted in different gaming environments according to some embodiments of the disclosure. In FIG. 3B, the controller 308 communicates with the service 306 for providing user input to an application session, with the AV rendering target of the application session being application 302 in a different gaming environment.

Figure 3C:
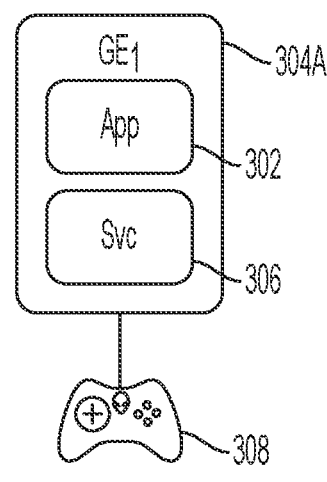
FIG. 3C is a block diagram illustrating an arrangement of applications and services hosted in a common gaming environment according to some embodiments of the disclosure.

Another arrangement for the application and service is shown in FIG. 3C. FIG. 3C is a block diagram illustrating application and service hosted in a common gaming environment according to some embodiments of the disclosure. In FIG. 3C, the application 302 and the service 306 are executed in the same gaming environment 304A, which may be a single device, two devices, or a combination of devices in the gaming environment 304A. The controller 308 may communicate with either the service 306 and/or the application 302.

Figure 3D:
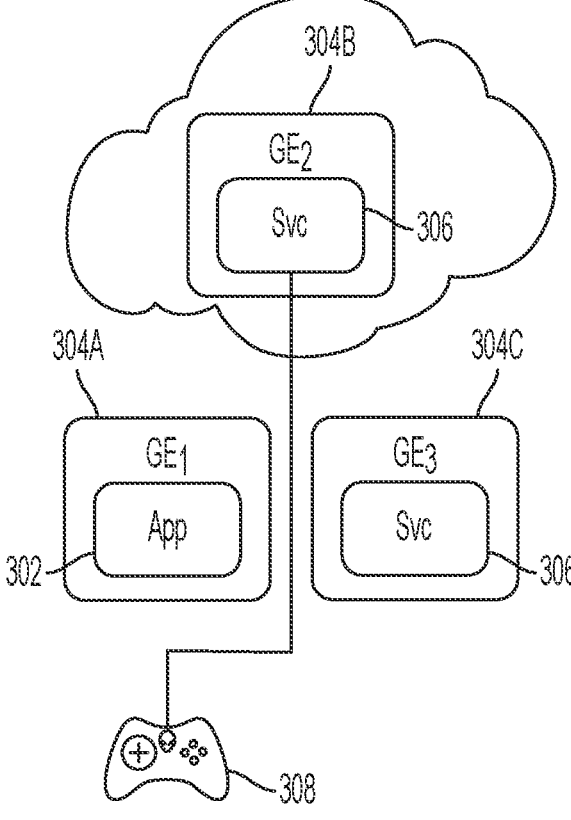
FIG. 3D is a block diagram illustrating a cloud-based service arrangement of a gaming environment according to some embodiments of the disclosure.

A further arrangement for the application and service is shown in FIG. 3D. FIG. 3D is a block diagram illustrating a cloud-based service arrangement for a gaming environment according to some embodiments of the disclosure. In FIG. 3D, the controller 308 may communicate with a service 306 hosted in a gaming environment 304B that is remote from the gaming environment 304A in which the application 302 is executing. The service 306 may be executing, for example, on a remote device, even though the user's home includes a gaming environment 304C in which the service 306 may be executed, when the user is engaging with the application 302 at a location on a different network from their home (e.g., at a friend's house). The service 306 may also or alternatively be executed, for example, on a cloud computing device available as a subscription service to the user.

In some embodiments, the service 306 may be used to monitor the wellness level of a user (or "gamer") in one or more of the gaming environments 304A-C of FIGS. 3A-3D described above and provide wellness assistance based on information relating to the user's wellness characteristics during a gaming session (e.g., a user session) of the application 302 (e.g., a gaming application). Such information may include telemetry data collected from various sources for the user during the session. The telemetry data may include, for example, a combination of session data and biometric data associated with the user. The session data may include gaming statistics based on user input received from the controller 308 as well as other gaming attributes or characteristics of the user, e.g., based on a gameplay history of the user with the application 302. The biometric data may include different measurements relating to the user's health or wellness, e.g., the user's heart rate, temperature, hand moisture levels, motion, etc., as collected by various sensors that are coupled to or integrated with the controller 308. In some embodiments, the telemetry data along with a gaming context associated with the application 302 may be used by the service 306 to determine whether the user needs wellness assistance during a portion of the gaming session (e.g., a particular stage of the game with which the user is experiencing some difficulty). The service 306 may then initiate a wellness assistance session to provide intelligent assistance with the user's personal wellness via at least one interface of a device associated with the user. Additional details regarding such a wellness assistance service (or wellness assistant) will be described with reference to the examples in FIGS. 4-9.

Figure 4:
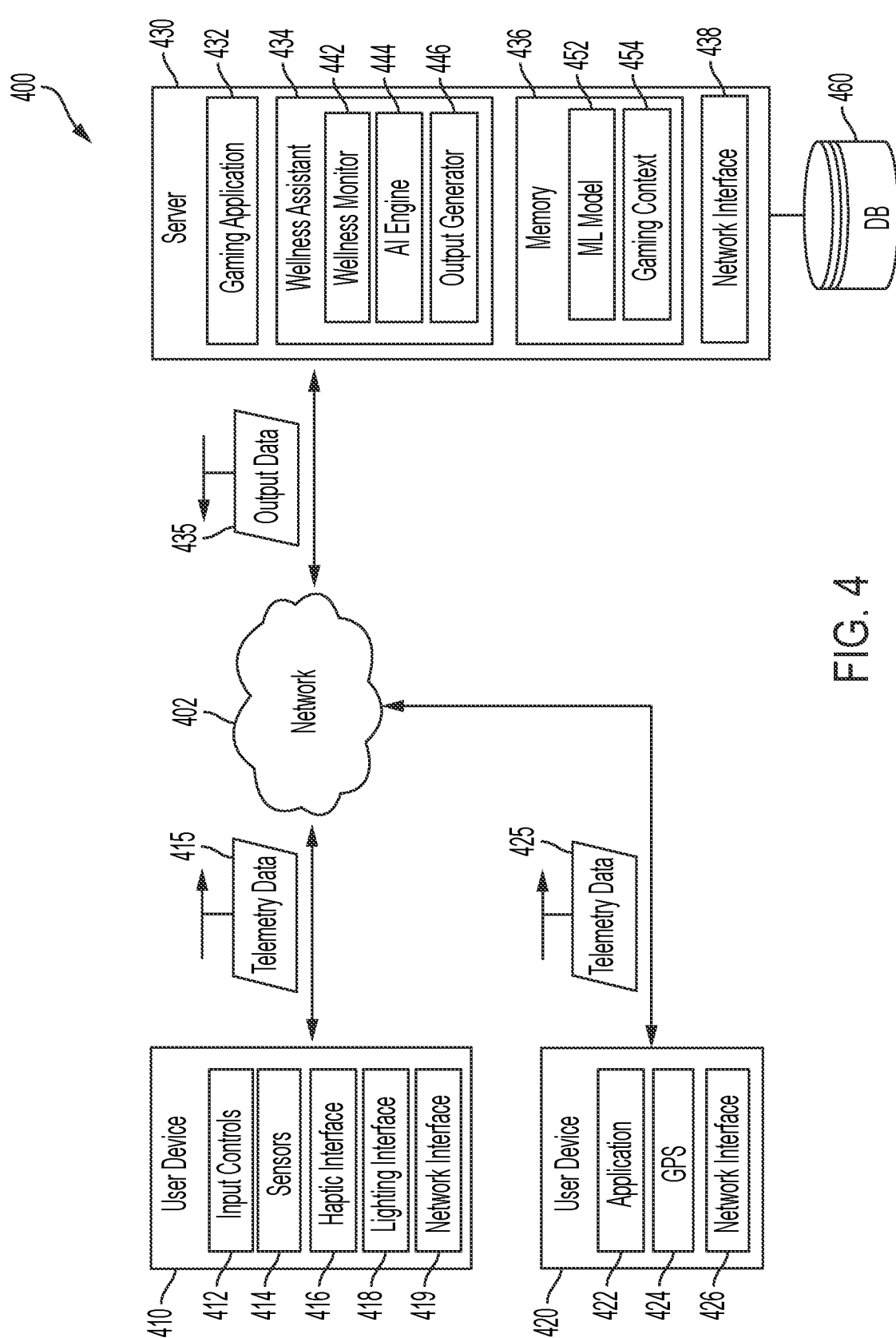
FIG. 4 is a block diagram illustrating an example of a system for providing wellness assistance to a user during a gaming session of a gaming application according to some embodiments of the present disclosure.

FIG. 4 is a block diagram illustrating a system 400 for providing assistance with a user's gaming performance during an application session (or gaming session) of a gaming application according to some embodiments of the present disclosure. System 400 may include or correspond to one or more devices in system 100 of FIG. 1, as described above.

As shown in FIG. 4, system 400 includes a user device 410, a user device 420, and a server 430. Each of the user devices 410 and 420 may be communicatively coupled to the server 430 via a network 402. The network 402 may include a wired network, a wireless network, or a combination thereof. To illustrate, the network 402 may include a Bluetooth personal area network (PAN), a local area network (LAN), a wireless LAN (WLAN), a wide area network (WAN), a wireless network (e.g., a cellular network), a wired network, the Internet, one or more other networks, or a combination thereof, as illustrative, non-limiting examples. In some implementations, the network 402 may include or correspond to a wired or wireless connection between the server 430 and each of the user devices 410 and 420.

In some embodiments, system 400 may be a gaming system in which the server 430 may include or correspond to an information handling system or hub device, such as a gaming console, a desktop computer, a laptop computer, a tablet, a mobile device, a server (e.g., a cloud server), or other type of computing device for executing games or gaming applications, such as a gaming application 432. The gaming application 432 may be any of various single-player or multi-player games. Examples of such games include, but are not limited to, puzzle games, role playing games, adventure games, first person shooter games, sports games, simulation games, strategy games, platformer games, and other games. In some implementations, server 430 may be used to host an application session (e.g., a gaming session) for the gaming application 432. In some implementations, the server 430 may operate as a gaming cloud server that provides a cloud-based execution environment for gaming applications, such as the gaming application 432, of the gaming system. In some embodiments, the server 430 may include a wellness assistant 434 that operates alongside the gaming application 432 to provide assistance with a user's gaming performance during a gaming session. As will be described in further detail below, the wellness assistant 434 may be an automated wellness assistance service hosted by the server 430 that monitors a wellness level of the user during the gaming session and provides wellness assistance or feedback (e.g., wellness advice or recommendations) via the user device 410 and/or the user device 420.

In some embodiments, the user devices 410 and 420 may be different types of peripheral devices, such as devices 110A-I of FIG. 1, associated with a user of the gaming system. Examples of different types of peripheral devices that may be associated with the user include, but are not limited to, a wired or wireless game controller (e.g., a gamepad or a joystick controller), a mouse, a keyboard, a display, a speaker, a microphone, a headset, a virtual reality (VR) device, an augmented reality (AR) device, a vehicle control simulation device (such as a racing wheel or a vehicle pedal assembly), a musical instrument simulation device (such as a guitar controller), a detachable controller, or a brain-computer interface (BCI) device, a streaming device (e.g., for streaming gaming content from the server 430), a handheld gaming device, a smartphone, and a tablet computer. Each type of peripheral device may include one or both of an input device that receives user input (such as user operation of a button or other input device) or an output device that generates an output (such as one or more of an audio output, a visual output, a haptic output, or another output).

Although the user devices 410 and 420 are illustrated in FIG. 4 as being external to the server 430, it should be appreciated that, in some implementations, one or more of these devices may be included or integrated within the server 430, for example, as part of a handheld gaming system. Also, while not shown in FIG. 4, it should be appreciated that certain output (e.g., video or audio output) generated in response to the user input may be provided to or experienced by the user via an output device (e.g., a display device or an audio speaker) that is coupled to or integrated with the server 430.

In some embodiments, the user device 410 may correspond to a first type of peripheral device, such as a wireless game controller (e.g., the game controller 110H of FIG. 1), which is communicatively coupled or paired with the server 430. In some implementations, the wireless game controller may also be coupled to or paired with one or more other information handling systems (or hub devices) corresponding to other gaming environments associated with the user (e.g., other rooms in the user's house). The user device 420 may correspond to a second type of peripheral device, such as a mobile device (e.g., the tablet computing device 110B or the phone computing device 110C of FIG. 1). In some implementations, the user device 420 (e.g., a mobile device) executes an application 422 (e.g., a mobile application) configured to communicate with the gaming application 432, which enables the user device 420 to operate as another peripheral device (e.g., a secondary controller or mobile gaming interface) for the user of the gaming system, e.g., for receiving and transmitting user input to the server 430 and/or generating an output for the user based on information received from the server 430.

Each of the user devices 410 and 420 may include a processor or other computing circuitry (e.g., a microcontroller, one or more application specific integrated circuits (ASICs), or the like) and various interfaces for input, output, and network communications with other devices (including the server 430). Each of the user devices 410 and 420 may also include a memory. The memory may include a read only memory (ROM) device, a random access memory (RAM) device, one or more hard disk drives (HDDs), a flash memory device, a solid state drives (SSDs), or any other device or combination of different devices configured to store data in a persistent or non-persistent state. In some implementations, the memory may be used to store one or more instructions, including instructions executable by the processor for a software application (such as the application 422 of the user device 420). Additionally or alternatively, the memory may be used to store one or more thresholds, data, user preferences, one or more device configurations, parameters, other device settings, or any combination of the foregoing.

In some embodiments, each of the user devices 410 and 420 may be configured to receive user input (such as from user operation of a button or other input device) and to transmit signals to the server 430 via the network 402 based on the user input. Each of the user devices 410 and 420 may also be configured to receive information (e.g., instructions or data or both) from the server 430 via the network 402 (e.g., in response to the transmitted signals) and to generate an output (such as one or more of an audio output, a visual output, a haptic output, or another output) based on the received information. Accordingly, the user devices 410 and 420 may include respective network interfaces 419 and 426 for communicating with the server 430 via the network 402. Each of the network interfaces 419 and 426 may include one or more communication interfaces, such as a long range (LoRa) interface, a Wi-Fi interface (e.g., an Institute of Electrical and Electronics Engineers (IEEE) 802.11 interface), a cellular interface (e.g., a fourth generation (4G) or long term evolution (LTE) interface, a fifth generation (5G) new radio (NR) interface, or the like), a Bluetooth interface, a Bluetooth low energy (BLE) interface, a Zigbee interface, a non-LoRa interface, another type of network interface, or any combination thereof.

In some embodiments, the user device 410 may further include one or more input controls 412, one or more sensors 414, a haptic interface 416, and a lighting interface 418. In some implementations, the input controls 412, the sensors 414, the haptic interface 416, and the lighting interface 418 may correspond to different input/output (I/O) interfaces for respective input and output devices of the user device 410. Such I/O interfaces may include one or more input interfaces for receiving user input based on the user's physical interaction with the one or more input controls 412.

The input controls 412 may include, for example, one or more depressible buttons, triggers, thumbsticks, scroll wheels, directional pads, touchscreens or touchpads, microphones, and other types of input controls that may be coupled to or integrated within the user device 410. The user device 410 may also include additional input interfaces for receiving sensor input (or measurements) from the one or more sensors 414. The one or more sensors 414 may include various sensors or measurement devices for collecting different types of biometric or wellness data associated with the user. Such sensors may be coupled to or integrated with the user device 410 (e.g., a game controller), as shown in FIGS. 5A and 5B.

Figure 5A:
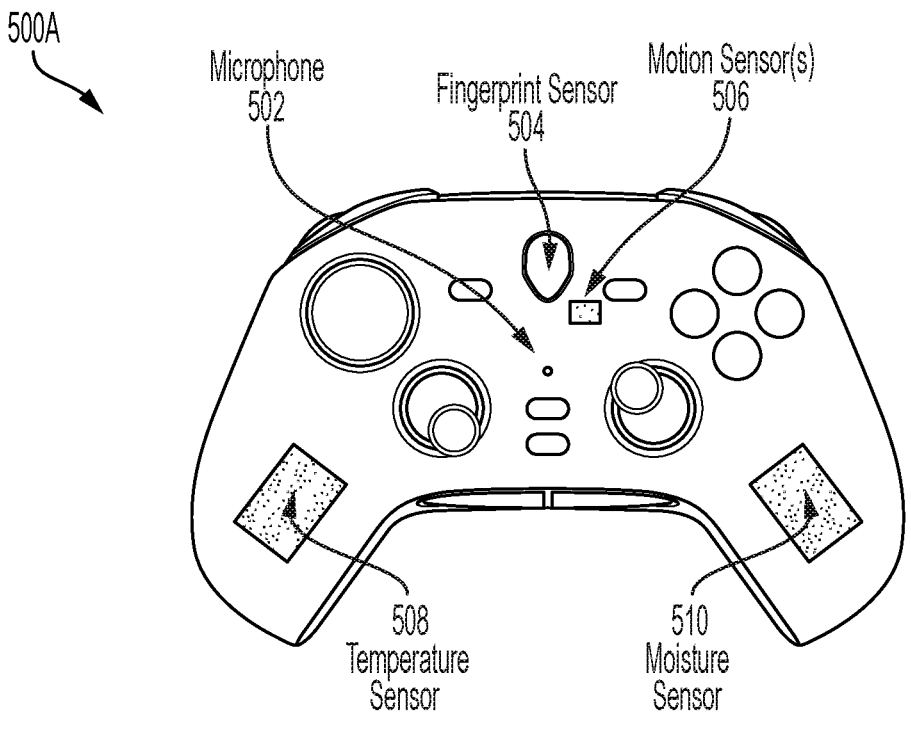
FIG. 5A is a diagram illustrating a view of a game controller including various sensors for collecting biometric data associated with a user during a gaming session according to some embodiments of the disclosure.
Figure 5B:
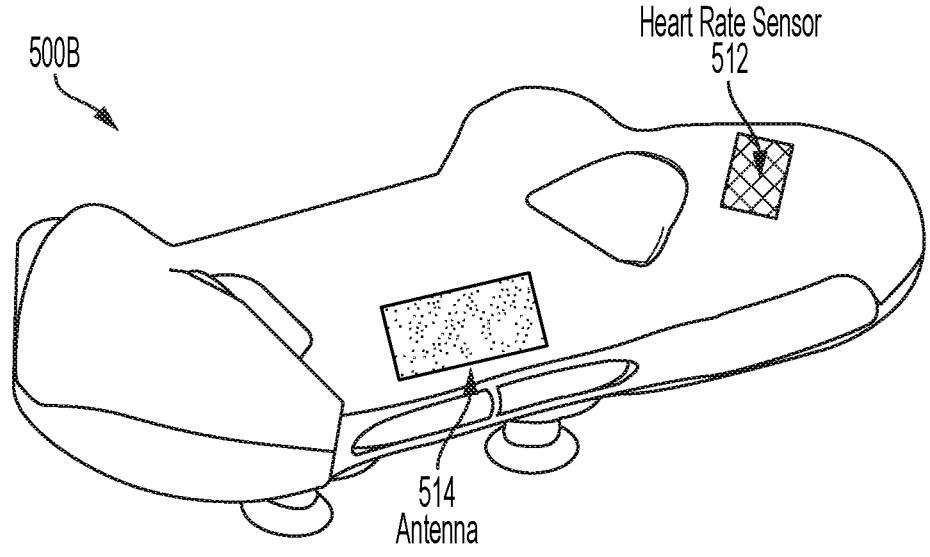
FIG. 5B is a diagram illustrating another view of the game controller of FIG. 5A with additional sensors for collecting additional biometric data associated with the user according to some embodiments of the disclosure.

FIG. 5A is a diagram illustrating a top view 500A of a game controller including various sensors for collecting wellness data associated with a user during a gaming session according to some embodiments of the disclosure. As shown in the example of FIG. 5A, the sensors of the game controller may include, but are not limited to, a microphone 502, a fingerprint sensor 504, one or more motion sensors 506, a temperature sensor 508, and a moisture sensor 510. Each sensor may be strategically placed in a location on the game controller that maximizes some performance or measurement criteria (e.g., based on the type of sensor) while satisfying one or more design constraints. For example, the microphone 502 may be placed in a central location on the game controller that is away from user input devices (e.g., buttons, thumbsticks, touchpads, etc.), and thus, less likely to be obstructed by the user's hands, to maximize a sound reception performance of the microphone 502.

The microphone 502 may be used to capture sounds (e.g., voice data for the user or other users in the user's vicinity) during the gaming session. The fingerprint sensor 504 may be used to scan the user's fingerprint, and the corresponding fingerprint data may be transmitted to an information handling system or hub device (e.g., the server 430 of FIG. 4) for purposes of user identification or account registration. In some implementations, the voice data from the microphone 502 may also be used (e.g., together with the fingerprint data from the fingerprint sensor 504) to identify the user before or during the gaming session. The motion sensor(s) 506 may be used to detect a motion of the user during the gaming session. In some implementations, the motion sensor(s) 506 may include an accelerometer or a gyroscope (or a combination of both) to detect and measure the frequency and/or direction of the user's motion during the gaming session. The temperature sensor 508 and the moisture sensor 510 may be used to measure the user's hand temperature and moisture levels, respectively, during the gaming session.

In some embodiments, the condition of the user's hand, as indicated by the measurements from the temperature sensor 508 and the moisture sensor 510, may serve as a proxy for the user's overall health or wellness level during the gaming session. Additionally or alternatively, the measurements of the user's hand temperature and moisture levels may be correlated with additional biometric or wellness data collected by one or more other sensors (e.g., motion data collected by the motion sensor(s) 506) to determine one or more physiological characteristics of the user, such as a stress level and/or an excitement level of the user at the time the data was collected. For example, measurements indicating relatively low hand temperature and moisture levels for the user with little to no motion detected may correspond to a low stress level and/or a low excitement level. By contrast, a relatively high hand temperature and/or moisture level with frequent motion detected may indicate a high excitement level. It is assumed for purposes of this example that the user's motion, temperature, and moisture are detected and/or measured while the user is holding or operating the game controller.

In addition to the sensors shown in FIG. 5A, the game controller may include other sensors or measurement devices for collecting additional biometric or wellness data associated with the user, as shown in FIG. 5B. In FIG. 5B, a bottom view 500B of the game controller of FIG. 5A is shown with a hear rate sensor 512 and an antenna 514. The heart rate sensor 512 may be used to measure a heart rate of the user during the gaming session. In some embodiments, the heart rate measurement from the heart rate sensor 512 may be correlated with the user's hand temperature and moisture data from the respective temperature and moisture sensors 508 and 510 along with the motion data collected by the motion sensor(s) 506 to determine the user's stress level and/or excitement level, as described above. For example, the telemetry from these different sensors may be combined to establish user-specific benchmarks for the biometric data used by the information handling system or hub device (e.g., the server 430) to gauge the user's stress level and/or excitement level during the current gaming session. In some embodiments, such benchmarks may be established and/or updated for the current gaming session based on biometric data collected for the user during one or more previous gaming sessions.

In addition to or as an alternative to detecting the user's motion using the motion sensor(s) 506, the antenna 514 may be used to measure or track the user's movement within one or more gaming environments (e.g., one or more rooms of the user's home, as described above). In some implementations, the antenna 514 may be an ultra-wideband (UWB) antenna used to track a location of the user relative to the known locations of other devices within the gaming environment(s). The user's location may correspond to a location of the game controller relative to one or more reference points (e.g., UWB tags or other network devices) corresponding to the one or more gaming environments. For example, the relative location of the user within a gaming environment may be based on differences in wireless signatures or wireless signal strengths measured or detected by the antenna 514 indicating a relative distance between the user (or controller) and a corresponding reference point.

Additionally, GPS data from the user's mobile device (e.g., GPS data collected by GPS 424 of the user device 420 in FIG. 4) may reveal an absolute location of the user and/or infrared data from an infrared presence or proximity sensor may reveal that the user is sitting in front of an AV device (e.g., a device within the gaming environment for displaying a graphical user interface and/or a rendered display from the gaming session). In some embodiments, the information handling system or hub device may combine individual pieces of telemetry from different sensors or devices into a confidence-based knowledge graph of the user's gaming environments and determine a position of the user within that graph. As described above, such a knowledge graph may be based on the absolute and/or relative locations of the user's devices, the location of the user in relation to each device, and or characteristics of the respective devices. The knowledge graph and the user's location within the one or more gaming environments may be tracked and updated in real time and/or based on changes in device telemetry. For example, the knowledge graph may include information about location of rooms (e.g., environments) in the house based on wireless signatures of devices within the different rooms. The difference in signatures reflects that a peripheral device (e.g., game controller) on one side of the house may receive beacon signals from different neighboring access points than a device on an opposite side of the house. When a user carries the peripheral device around the house, the hub device may determine a location of the peripheral device (and the user) based on visible access points to the peripheral device.

Referring back to FIG. 4, the measurements collected by the sensors 414 of the user device 410 (e.g., one or more of the microphone 502, the fingerprint sensor 504, the motion sensor(s) 506, the temperature sensor 508, the moisture sensor 510, the heart rate sensor 512, and the antenna 514 of FIGS. 5A and 5B, as described above) may be transmitted to the server 430 as telemetry data 415 via the network 402. In some embodiments, the telemetry data 415 may also include session data collected by the user device 410. The session data may include, for example, input data indicating the particular input controls 412 used or operated by the user during the gaming session for the gaming application 432. In some implementations, the input controls 412 may be sorted by frequency of usage during gameplay by the user to obtain input usage statistics associated with the user for the gaming application 432. The input data generated by the input controls 412 may include, for example, the user's button selections or other input entered by the user using the input controls 412 during the gaming session.

Like the user device 410, the user device 420 may include various I/O interfaces for input, output, and network communications. In some embodiments, the user device 420 may further include the application 422 and a global positioning system (GPS) 424. As described above, GPS data collected by the GPS 424 may be combined with other telemetry data (e.g., a portion of the telemetry data 415 collected by one or more of the sensors 414 of the user device 410) to track the location of the user within one or more gaming environments.

As described above, the application 422 executed by the user device 420 may enable the user device 420 to operate as a peripheral device for the user of the gaming system. In some implementations, the application 422 may serve as a mobile gaming companion for the gaming application 432 executed by the server 430. For example, the application 422 may be used to extend the functionality of the gaming application 432 to the user device 420. The application 422 may include a graphical user interface (GUI) that enables the user to conveniently access different features of the gaming application 432 from the user device 420. For example, the user may interact with the GUI of the application 422 to register or update the user's gaming profile or account for the gaming application 432 (or a gaming cloud service associated therewith) by entering registration information (e.g., the user's age, gender, and other relevant user info) before or during the gaming session. In addition to such account registration features, the application 422 may include gameplay features (e.g., for enabling the user device 420 to serve as a game controller or other peripheral device for the gaming session) and/or assistance notification features (e.g., for receiving gaming assistance, such as relevant gaming advice or tips, via the GUI of the application 422 or other interface, such as via email or other messaging interface, at the user device 420).

In some embodiments, the data input by the user (e.g., registration information entered by the user) via the GUI of the application 422 and/or the GPS data collected by the GPS 424 may be transmitted as telemetry data 425 from the user device 420 to the server 430 via the network 402. As will be described in further detail below, the telemetry data 415 from the user device 410 and the telemetry data 425 from the user device 420 may be analyzed by the wellness assistant 434 at the server 430 to monitor the user's gaming performance and provide assistance with at least a portion of the gaming application 432 during a gaming session. As part of the assistance provided by the wellness assistant 434, the server 430 may transmit output data 435 to the user device 410 and/or the user device 420 via the network 402. The I/O interfaces of the respective user devices 410 and 420 may also include one or more output interfaces to provide one or more outputs for the user via corresponding output devices coupled to or integrated with the user device 410 and/or the user device 420, based on the output data 435 received from the server 430. The output(s) may include, for example, an audio output via one or more speakers, a visual output via a display, a light output via one or more light sources (e.g., a light ring), a haptic output via one or more haptic or vibration devices (e.g., haptic feedback via a haptic touchpad or a rumble motor), or any combination of the foregoing. For example, the output interfaces of the user device 410 may include the haptic interface 416 for the haptic output and the lighting interface 418 for the light output.

The server 430 may include or correspond to a computing device, e.g., computing device 114 of FIG. 1. Server 430 may include one or more processors (not shown), such as a CPU or other computing circuitry (e.g., a microcontroller, one or more ASICs, or the like) and may have one or more processing cores. Server 430 may further include a memory 436 and a network interface 438 for communicating with user device 410 and user device 420 over network 402. The processor(s), memory 436, network interface 438 and other components of server 430 may be coupled to each other via a data bus.

The memory 436 of the server 430 may include a read only memory (ROM) device, a random access memory (RAM) device, one or more hard disk drives (HDDs), a flash memory device, a solid state drives (SSDs), another devices configured to store data in a persistent or non-persistent state, or a combination of different memory devices. The memory 436 may be a computer-readable medium used to store one or more instructions, such as instructions or code for the gaming application 432 and the gaming assistant 434. To illustrate, the memory 436 may store instructions that, when executed by the processor(s) of the server 430, cause the processor(s) to perform operations relating to the gaming performance assistance techniques disclosed herein. Additionally, the memory 436 may be used to store one or more thresholds, data, preferences, other settings, or any combination thereof. In some embodiments, the memory 436 may also be used to store a machine learning (ML) model 452 and data for a gaming context 454 associated with the gaming application 432 and/or gaming session of the user.

In some implementations, such data may include historical session data collected for the user over multiple gaming sessions and stored in a database (DB) 460 coupled to the server 430. Such historical data may include the user's gameplay history, including historical information about different gaming environments (e.g., different rooms of the user's house) from which the server 430 (e.g., implemented as a hub device) may use current characteristics of at least one of the user's peripheral devices (e.g., user devices 410 and/or 420) to deduce the device's location, and thus current gaming environment of the user. In some implementations, this historical information may be stored within the DB 460 in association with a user profile or account registered to the user. The user profile or account may include the user's age, gender, and other relevant data about the user. Additionally, the DB 460 may be used to store device metadata (e.g., in associated with the user's profile), which identifies the user devices 410 and 420 and one or more application environments (such as gaming environments 204A-E of FIG. 2, gaming environments 304A-C of FIGS. 3A-3D, or a combination thereof) in which each user device was detected. The device metadata may include a unique device identifier, a device type, a device manufacturer, a device model, or any combination thereof. In some embodiments, a similar user profile may be stored for each user associated with the gaming environments (e.g., each family member or gamer who resides in the user's house).

As described above, the wellness assistant 434 executed by the server 430 may operate alongside the gaming application 432 to provide assistance with a user's personal wellness during a gaming session hosted by the server 430. The assistance may be based, at least in part, on telemetry data received by the server 430 via the network 402 and the network interface 438. The network interface 438 includes one or more communication interfaces. For example, the network interface 438 may include a LoRa interface, a Wi-Fi interface (e.g., an IEEE 802.11 interface), a cellular interface (e.g., a 4G or LTE interface, a 5G NR interface, or the like), a Bluetooth interface, a BLE interface, a Zigbee interface, a non-LoRa interface, another type of network interface, a combination thereof, or the like.

In some embodiments, the wellness assistant 434 may include a wellness monitor 442, an AI engine 444, and an output generator 446. In some implementations, the gaming application 432 and/or the wellness assistant 434 (including the wellness monitor 442, the AI engine 444, and the output generator 446) may be included in the processor or processing circuitry of the server 430. The wellness monitor 442 may use the AI engine 444 to monitor the user's personal wellness based on the telemetry data 415 received from the user device 410 and/or the telemetry data 425 received from the user device 420 via the network 402 during the gaming session. In some embodiments, the telemetry data 415 and 425 may be aggregated and correlated by the wellness monitor 442. For example, the wellness monitor 442 may include a telemetry analyzer (not shown) to analyze and parse the telemetry data 415 and 425 into session data and biometric data. The session data and biometric data may then be provided to the AI engine 444. The AI engine 444 may apply this data to train the ML model 452 for further analysis and processing relating to the wellness monitoring operations associated with the wellness monitor 442.

The AI engine 444 may also use the ML model 452 to determine and select one or more appropriate options for providing wellness assistance to the user during the gaming session. Based on the selected assistance option, the output generator 446 may initiate a wellness assistance session. In some embodiments, the assistance options may be based on the gaming context 454 associated with the gaming application 432, as will be described in further detail below with respect to the example data flow of FIG. 6.

In some embodiments, the AI engine 444 may incorporate user feedback to evaluate the effectiveness of the assistance session and, if necessary, retrain the ML model 452 to improve the assistance provided during subsequent gaming sessions based on the user's wellness characteristics over time. In some embodiments, the feedback may be based on a comparison of the user's wellness level (e.g., based on a wellness score assigned to the user) before and after the wellness assistance session.

Figure 6:
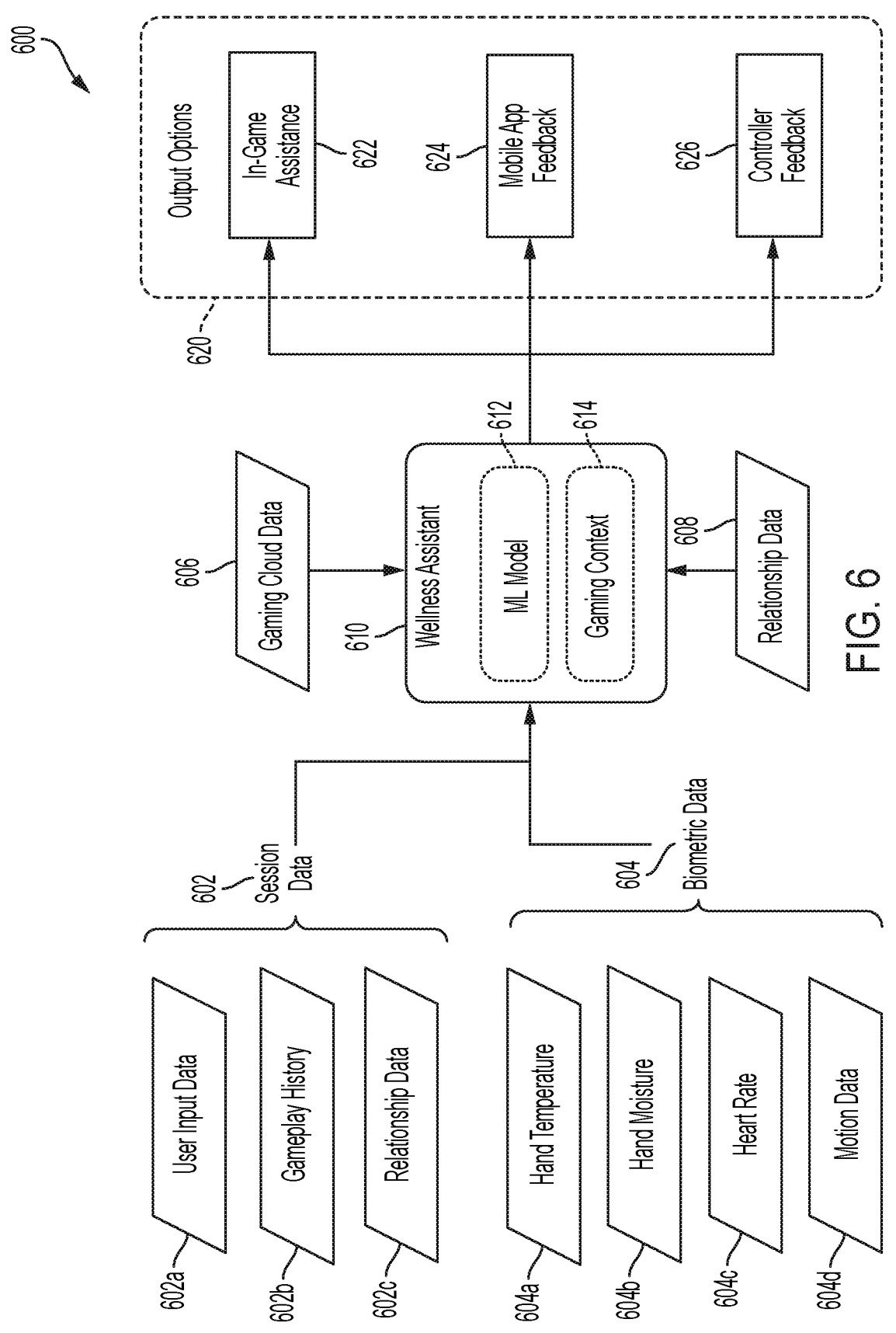
FIG. 6 is a diagram of an example data flow illustrating inputs and outputs of a wellness assistant module or service for providing wellness assistance to a user during a gaming session of a gaming application according to some embodiments of the disclosure.

FIG. 6 is a diagram of an example data flow 600 illustrating inputs and outputs of a wellness assistant module or service (e.g., the wellness assistant 434 of FIG. 4) for providing assistance with a user's personal wellness during a gaming session of a gaming application (e.g., gaming application 432 of FIG. 4). As shown in FIG. 6, the inputs of a wellness assistant 610 may include session data 602, biometric data 604, gaming cloud data 606, and relationship data 608. The outputs of the wellness assistant 610 may include various output options 620 for initiating a wellness assistance session via one or more interfaces of a device associated with the user. The wellness assistant 610 may be executed by an information handling system or hub device (e.g., the server 430 of FIG. 4) alongside the gaming application to monitor a wellness level of the user based, at least in part, on the session data 602 and the biometric data 604 received for the user during a gaming session. In some embodiments, the session data 602 and the biometric data 604 may be received by the wellness assistant 610 at the information handling system or hub device from various data sources. Such data sources may include one or more peripheral devices associated with the user (e.g., the user device 410 and/or user device 420 of FIG. 4, as described above) and one or more data repositories, such as a local database coupled to the hub device (e.g., the DB 460 of FIG. 4) or a cloud data repository (e.g., an online data repository associated with a cloud gaming service hosted by another information handling system or a cloud computing resource). In some implementations, such a cloud data repository may be used to store gaming cloud data 606.

The session data 602 may include user input data 602a, gameplay history 602b, and household data 602c. The user input data 602a may include input data indicating the particular input controls (e.g., input controls 412 of FIG. 4) of a peripheral device (e.g., game controller) used or operated by the user during the gaming session for the gaming application. In some embodiments, the user input data 602a may also include user profile data (e.g., the user's age, gender, etc.) entered by the user before or during the gaming session, e.g., as part of an account registration process via a mobile application executable at the user's mobile device (e.g., via the application 422 of the user device 420, as described above). In addition to the information received from one or more devices of the user, the session data 602 may include the user's gameplay history 602b and household data 602c, which may be accessed by the information handling system or gaming assistant 610 from the local database or the cloud data repository described above. Although the gameplay history 602b and the household data 602c are shown separately from the gaming cloud data 606, it should be appreciated that, in some implementations, the gameplay history 602b and the household data 602c (or different portions thereof) may be included within the gaming cloud data 606 accessed or received from the cloud data repository, as described above.

The gameplay history 602b may include, for example, the user's gaming preferences, such as the user's preferred gaming time(s) (e.g., time of day, day of week, and/or other time period) and the duration of each gaming session at the corresponding time(s). Additionally, the gaming characteristics may include information that is indicative of the user's level of experience or skill, such as an amount of time the user has spent gaming, an amount of time the user has spent playing games in a particular genre, an amount of time the user has spent playing a particular game, a level of completion the user has attained in a particular game, levels of completion the user has attained in games of a particular genre, and in-game performance statistics, such as kill/death ratios, speed-run time records and other statistical data regarding the user's gaming performance obtained from the gaming application during each gaming session.

The household data 602c may include information about the size of the user's house, the location of rooms (or gaming environments) within the house, the identity of other users/ gamers (e.g., family members) who reside in the house, and any other relevant information about the user's location relative to that of other users within the gaming environments. As described above, such information may be based on a knowledge graph indicating the locations of various devices within each gaming environment based on differences between the wireless signatures and other characteristics of devices and/or access points associated with each environment.

The biometric data 604 may include measurements relating to the user's health or wellness as collected by the one or more sensors 414 that are coupled to or integrated with the user device 410 (e.g., a game controller). The biometric data 604 may include, for example, hand or skin temperature data 604a (e.g., as measured by the temperature sensor 508 of FIG. 5A), hand or skin moisture data 604b (e.g., as measured by the moisture sensor 510 of FIG. 5A), heart rate data 604c (e.g., as measured by the heart rate sensor 512 of FIG. 5B), and motion data 604d (e.g., as measured by the one or more motion sensors 506 of FIG. 5A).

The relationship data 608 may include any information that may be used to establish a relationship between the user and other users within one or more gaming environments (e.g., different rooms of the user's house). Such information may be obtained from the user profile data described above and/or the profile data associated with other related users (e.g., other members/gamers of the user's family who also reside in the house). The relationship data 608 may indicate, for example, if the user is playing alone within the gaming environment or if there are any other known users located nearby. The indication may be based on, for example, the recognition of another user's voice captured by a microphone coupled to or integrated with a peripheral device of the user (e.g., the microphone 502 of the game controller of FIG. 5, as described above) during the gaming session.

In some embodiments, the gaming assistant 610 (or an AI engine thereof) may use a ML model 612 to analyze the session data 602 and the biometric data 604 along with information relating to a gaming context 614 of the gaming application to monitor the user's gaming performance during the gaming session and to determine whether the user needs assistance with at least a portion of the gaming application. The session data 602 may indicate one or more gaming characteristics of the user, such as a skill level of the user, during the gaming session. The biometric data 604 may indicate an excitement level or mood of the user during the gaming session, such as whether the user in a mood that is receptive to accepting or receiving gaming assistance. For example, the gaming assistant 610 may determine that the user needs assistance with at least a portion of the gaming application during the gaming session if, for example, the analysis of the session data 602 indicates that the skill level of the user is below a threshold skill level for that portion of the gaming application and the analysis of the biometric data 604 indicates that the user is in a mood that is receptive to gaming assistance.

The gaming context 614 may indicate, for example, the type of gaming application (e.g., single-player vs. multi-player game), the gaming genre or category of the gaming application, the recommended age rating of the gaming application, and the type of gaming environment (e.g., a local gaming environment vs. an online or cloud-based gaming environment) supported by the gaming application. The gaming context 614 for the gaming application may be determined based on the gaming cloud data 606 acquired from an online or cloud data repository associated with a cloud gaming service, as described above. In some implementations, the online data repository may also serve as a resource or reference guide for relevant gaming advice, tips, or assistance information for the gaming application. that may be used to provide the in-game assistance 622 or the mobile application feedback 624. Accordingly, the gaming cloud data 606 may further include information that may be used to provide gaming assistance as an output of the analysis performed by the ML model 612.

In some embodiments, the gaming assistance may correspond to one or more output options 620. The output options 620 may include, for example, in-game assistance 622 provided via an on-screen display with assistance information superimposed on the gaming content rendered for the gaming application during the gaming session, mobile application feedback 624 provided via an interface of a mobile application executable at the user's mobile device (e.g., the user device 420), and/or controller feedback 626 provided via a haptic or lighting interface of the user's game controller or other peripheral device (e.g., via the haptic interface 416 or the lighting interface 418 of the user device 410).

FIG. 7 is a flow diagram of an example method 700 for providing assistance with a user's personal wellness during a gaming session of a gaming application according to some embodiments of the disclosure. Method 700 may be performed by an information handling system or hub device, such as the server 430 of FIG. 4, as described above. In some implementations, the hub device may be part of a gaming system that includes a display device (or "gaming display") for rendering gaming content generated by the gaming application and one or more peripheral devices (e.g., the game controller of FIGS. 5A and 5B) associated with the user.

Method 700 begins at block 702, which includes acquiring telemetry data associated with a user during a gaming session for a gaming application (e.g., the gaming applica-tion 432, as described above) executed by the information handling system or hub device. The telemetry data may include session data, biometric data, and relationship data associated with the user. The session data may be indicative of one or more gaming characteristics of the user, such as a skill level of the user with respect to the gaming application (or relevant portion thereof). The biometric data may be indicative of one or more physiological characteristics of the user, such as a stress level of the user, during the gaming session. In some embodiments, the biometric data may include sensor measurements received from a peripheral device (such as a game controller) of the user (e.g., the user device 410 of FIG. 4) during the gaming session. The peripheral device may include, for example, one or more sensors for collecting the sensor measurements. In some embodiments, the one or more sensors may include one or more of: a moisture sensor to measure hand moisture; a temperature sensor to measure hand temperature; a hear rate sensor to measure heart rate; at least one location sensor (e.g., a GPS and/or a wireless antenna) to measure a location of the user; and at least one motion sensor (e.g., an accel-erometer and/or a gyroscope) to detect motion or measure a movement of the user.

At block 704, a wellness level of the user is monitored during the gaming session, based, at least in part, on the telemetry data received at block 702. Based on this moni-toring, a determination is made at block 706 as to whether the user needs personal wellness assistance during a portion of the gaming session, e.g., corresponding to a difficult stage or other challenging portion of the gaming application. In some embodiments, the determination at block 706 may include determining whether a stress or excitement level of the user is above a threshold stress level and determining that the user needs wellness assistance when the stress level of the user is above the threshold stress level during the portion of the gaming session. The threshold stress level may be based on, for example, a previous stress level of the user during corresponding portions of one or more previous gaming sessions. Alternatively, the threshold stress level may be based on an average stress level of others users associated with the gaming application.

In some implementations, a wellness score representing the wellness level and/or stress level may be calculated based on the telemetry data acquired for the user during the gaming session. For example, an AI engine (e.g., AI engine 444 of FIG. 4) or a machine learning (ML) model thereof (e.g., ML model 452 of FIG. 4 or ML model 612 of FIG. 6) may identify one or more biometric data points (e.g., hand temperature data 604a, hand moisture 604b, heart rate 604c, and motion data 604d of FIG. 6) relevant to the user's stress level and overall wellness level. The AI engine may then assign weights to each biometric data point based on its importance in assessing stress and/or wellness. The data may be normalized to ensure that different data points are on the same scale for comparison purposes. Normalization may involve, for example, scaling the data to a common range or using standard deviation normalization. The scaled data may then be used to define scoring ranges for one or more physiological characteristics of the user, such as different excitement levels, stress levels and/or wellness levels. For example, the scoring ranges for different stress levels on a scale of 0-10 may include or correspond to a low stress level (0-3), a moderate stress level (4-6), a high stress level (7-9), and very high stress level (10). The scoring ranges or values for different wellness levels may include or correspond to, for example, poor (0-3), fair (4-6), good (7-9), and excellent (10). Similar scoring ranges may be used for different excitement levels, e.g., a low excitement level (0-3), a moderate excitement level (4-6), a high excitement level (7-9), and a very high excitement level (10). Such ranges may then be used to calculate intermediate or sub-scores for each biometric data point by mapping the normalized data point onto the defined scoring ranges. For example, a sub-score of 5 may be assigned for heart rate if the user's measured heart rate during the gaming session falls within the range associated with moderate stress. In some implementations, each sub-score may be assigned a weight based on its relative importance to the user's stress level or overall wellness and the weighted sub-scores may be added together to obtain an aggregated wellness score. The scores may be interpreted or compared against the threshold stress level to determine at block 708 whether the user is in need of personal wellness assistance. The threshold stress level may be, for example, a predetermined maximum stress level (e.g., corresponding to the moderate stress range described above).

If it is determined at block 708 that no assistance is needed, the method 700 returns to block 704 to continue monitoring the user's wellness (or stress) level. However, if it is determined at block 708 that assistance is needed (e.g., when the stress level of the user is above the threshold stress level), the method 700 proceeds to block 710. At block 710, a wellness assistance session for the user is initiated via an interface of at least one device associated with the user. For example, block 710 may include initiating an in-game wellness assistance session via an on-screen display interface associated with the gaming application. Additionally or alternatively, the wellness assistance session at block 710 may be initiated by providing wellness feedback (e.g., wellness advice or suggestions) to the user via a user interface of a mobile application (e.g., application 422 of FIG. 4) executable at a mobile device of the user (e.g., the user device 420 of FIG. 4), as described above. Additionally or alternatively, the wellness assistance session at block 710 may be initiated by triggering haptic feedback via a haptic interface of the user's peripheral device and/or by triggering feedback via a lighting interface of the peripheral device.

In some implementations, the in-game wellness assistance session may be initiated only after the user agrees or confirms the user's willingness to receive wellness assistance. For example, the wellness assistant may first display a prompt via a display interface of a display device (or gaming display) coupled to the information handling system or hub device (e.g., the server 430 of FIG. 4). In some implementations, the prompt may be displayed in a dialog or pop-up window (e.g., as an overlay displayed with the rendered gaming content on the gaming display), which asks or requests the user to confirm that wellness assistance is needed during the gaming session and includes selectable control buttons (marked "yes" and "no"). In response to receiving user input confirming that the user needs assistance (e.g., based on the user's selection of the button marked "yes"), the in-game wellness assistance may be provided by the wellness assistant, for example, by providing wellness assistance information (e.g., relevant health advice or tips) via an on-screen display interface of the gaming display (e.g., within the same or a different pop-up window as the prompt displayed earlier). The wellness assistant may also trigger haptic feedback via a haptic interface of a peripheral device (e.g., wireless game controller) associated with the user and/or lighting feedback via a lighting interface of the user's game controller (e.g., by triggering different light sources on the controller in a predefined pattern or sequence via the lighting interface 418 of the user device 410 shown in FIG. 4) based on the user's response (e.g., to acknowledge receiving the requested confirmation from the user). Additionally or alternatively, the wellness assistant may provide wellness feedback via a user interface of a mobile application executable at a mobile device of the user (e.g., via a GUI of the application 422 or other messaging interface at the user device 420 of FIG. 4). The wellness feedback provided via the mobile device may include, for example, one or more health tips or warnings for the user (e.g., if an abnormal heart rate or other high stress level is detected).

In some embodiments, the wellness (or stress) level of the user after the wellness assistance session may be assessed and feedback data from the assessment may be used to retrain the ML model used by the AI engine and improve any wellness assistance provided to the user during one or more subsequent gaming sessions.

FIG. 8 is a table 800 including different examples of scenarios for providing wellness assistance to a user (e.g., using method 700 of FIG. 7) based on telemetry data (including session data and biometric data) collected for the user during a gaming session. The gaming session may be for a game or gaming application (e.g., gaming application 432 of FIG. 4) executed by an information handling system or hub device (e.g., system 430 of FIG. 4). In some implementations, the hub device may be part of a gaming system that includes a display device (or gaming display) for rendering gaming content generated by the gaming application and one or more peripheral devices (e.g., the game controller of FIGS. 5A and 5B) associated with the user. As described above, the telemetry data may include session data indicating one or more gaming characteristics of the user, biometric data indicating one or more physiological characteristics of the user (such as the user's level of stress during the gaming session), and relationship data indicating social connections between the user and other users associated with one or more gaming environments (e.g., one or more rooms of the user's house) in which the gaming session (or similar gaming sessions take place). The telemetry data for the user in each scenario may be analyzed by an AI engine (e.g., the AI engine 444 of FIG. 4) of a wellness assistant (e.g., wellness assistant 434 of FIG. 4 or wellness assistant 610 of FIG. 6) executed by the information handling system alongside the gaming application, as described above.

As shown in FIG. 8, the first row of table 800 corresponds to a scenario 810, where the session data indicates that the user has been playing one or more games in the same gaming environment (e.g., living room) for an extended period of time (e.g., 5 hours). The AI engine in scenario 810 may initiate a personal wellness assistance session for the user by suggesting that the user take a break, e.g., by displaying a message within an overlay window via on-screen display (OSD) interface of the gaming display and/or by triggering lighting and/or haptic feedback via respective lighting and haptic interfaces of the user's game controller (e.g., the haptic interface 416 and the lighting interface 418 of the user device 410 shown in FIG. 4).

In another scenario 820 corresponding to the second row of table 800, the AI engine may determine that the user has been playing the game(s) in the gaming environment (e.g., living room) for over 15 minutes while standing (e.g., based on height measurements collected by accelerometer and gyroscope sensors of the user's game controller). The AI engine in scenario 820 may initiate a personal wellness assistance session for the user by displaying a message via the OSD interface of the gaming display with a suggestion for the user to take a seat. The AI engine in this scenario may also have knowledge of the user's location relative to other devices and objects (e.g., the living room sofa) in the user's gaming environment (e.g., based on a confidence-based knowledge graph built using available telemetry from various sources, as described above). Therefore, the wellness assistance provided by the AI engine may also include triggering lighting feedback via the lighting interface of the user's controller, which guides or directs the user to the location of the sofa.

In yet another scenario 830, the AI engine may determine from the session data that the user has initiated the gaming session on a Wednesday night (e.g., after working hours). Based on the biometric data (e.g., voice data and heart rate), the AI engine in this scenario may also determine that the user is in a state of tiredness or a very low excitement level (e.g., based on a low heart rate, little-to-no movement or motion detected, and no voice data recorded). In this scenario, the AI engine may suggest a relaxing game for the user to play and also, display health tips for the user when the screen is idle (e.g., between gaming sessions).

FIG. 9 is a table 900 including additional examples of scenarios for providing wellness assistance to one or more users based on telemetry data (including biometric data, session data, and relationship data) received for the user during a gaming session according to some embodiments of the disclosure. In a first scenario 910, the biometric data may provide a wellness indication for a first user in the form of a heart rate recorded by a heart rate sensor (e.g., heart rate sensor 512 of the game controller shown in FIG. 5B). The session data may include historical gameplay data from previous gaming sessions indicating that the first user plays often. The session data may include the time of day and duration of each session associated with the first user. Furthermore, the session data may be recorded with relationship data indicating the identity, age, and gender of any other user who may also be playing at the same time as the first user as well as the type or genre of the game each user is playing.

The AI engine in scenario 910 may analyze the first user's heart rate pattern based on gaming cloud data (e.g., gaming cloud data 606 of FIG. 6). For example, the AI engine may attempt to match the first user's heart rate pattern or pattern of heart rate variability with that of other known users of the same gender and in the same age bracket to identify any patterns that correspond to a particular physiological state. This may allow the AI engine to determine or estimate the physiological state of the first user and provide appropriate wellness assistance to the first user. For example, a wellness assistance session may be initiated via an interface of a mobile application executable at a mobile device (e.g., the user device 420 of FIG. 4) associated with the first user. The wellness assistance session may be used to indicate a cardio health score and/or provide wellness advice, health tips or warnings, e.g., if an abnormal heart rate is detected (such as an extremely high heart rate during a combat game). The wellness assistance may also include triggering feedback via a lighting and/or haptic interface of the first user's game controller as a reminder for the first user to take a rest or slow down. In some implementations, various rewards (e.g., digital wallpaper, points or other in-game rewards) may be provided if the first user follows the wellness advice (e.g., by taking a break, such as in a scenario 920).

In scenario 920, the biometric data may indicate that the first user's location corresponds to the living room. The session data and relationship data may indicate that the first user and a second user have been playing for really long hours. The AI engine may also have learned the location of seats within the living room (e.g., based on the knowledge graph described above). The AI engine may analyze the game content to determine the best timing for providing assistance. For example, the AI engine may suggest taking a bio break after detecting that the first and second users have passed a stage of the game. The AI engine in this scenario may display a message via the OSD interface of the gaming display and if necessary, also trigger controller lighting and/or haptic feedback as reminders. The lighting may be used to guide each user to a seat if required (e.g., if the AI engine detects one or both of the users are standing during the gaming session). If either user is a minor (e.g., below a minimum age threshold, as indicated by corresponding user profile information included in the session data), the AI engine may optionally inform the user's parents or other designated contact related to the user (e.g., another adult family member) of any wellness suggestions intended for the user (e.g., based on parental settings associated with the gaming application and/or relationship data associated with the user or user profile that identifies one or more designated contacts).

In yet another scenario 930, which is similar to the scenario 830 in table 800 of FIG. 8, the AI engine may determine from the biometric data (e.g., voice data and heart rate) that the first user is in a state of tiredness or a very low excitement level (e.g., based on a low heart rate, little-to-no movement or motion detected, and no voice data recorded). The session data may also indicate that the first user has initiated the gaming session late at night after working hours. Based on the first user's gaming preferences, the AI engine may suggest one or more relaxing game options for the user to play (e.g., a puzzle game or other less competitive games with shorter periods of gameplay). The wellness assistance in this case may include one or more links to the suggested game(s) (e.g., within a game library, such as the library 106 of FIG. 1 described above) or to a gaming website for the user to purchase or download the suggested game(s). The AI engine may also display health tips for the user, for example, when the screen is idle for a certain period of time or between gaming sessions.

In addition to the types of wellness assistance in the example scenarios of FIGS. 8 and 9 described above, it should be appreciated that the wellness assistant (or AI engine thereof) may be used to provide other types of wellness assistance, such as recommendations for collaborative-based games rather than competition-based games to promote social connections or family relationships. This type of wellness assistance may be based on analysis of various telemetry data relating to a user's gaming preferences or gameplay characteristics, such as time information (e.g., preferred day and duration of gameplay) and location information (e.g., preferred gaming environment, such as one or more rooms of the user's house). The AI engine may analyze such information together with other telemetry data, such as relationship data, session data, and/or biometric data, collected for each user (e.g., each family member within a household) to provide appropriate wellness suggestions or recommendations to a user detected within a particular gaming environment (e.g., living room or other room of the house), as shown by the various scenarios in table 1000 of FIG. 10.

If the session data indicates that the user is a minor (or below a minimum threshold age), such as in a scenario 1060 of the table 1000, a recommendation may be sent to one or more other users related to the user, such as the minor's parents or other designated contact identified by the relationship data associated with the user, as described above. The recommendation in this scenario may be sent to the user's (or kid's) parents (e.g., based on the relationship data) and the kid's gaming preferences or habits (e.g., based on other session data). For example, the assistance provided in the scenario 1060 may be a recommendation for a multi-user racing game sent to the parents of the user/kid (or corresponding devices thereof). The recommendation in this example may be based on session data from previous gaming sessions that indicates the kid has played racing games and therefore, may prefer to play a multi-user racing game with other users (e.g., one or more other family members who also like to play racing games).

Figure 11:
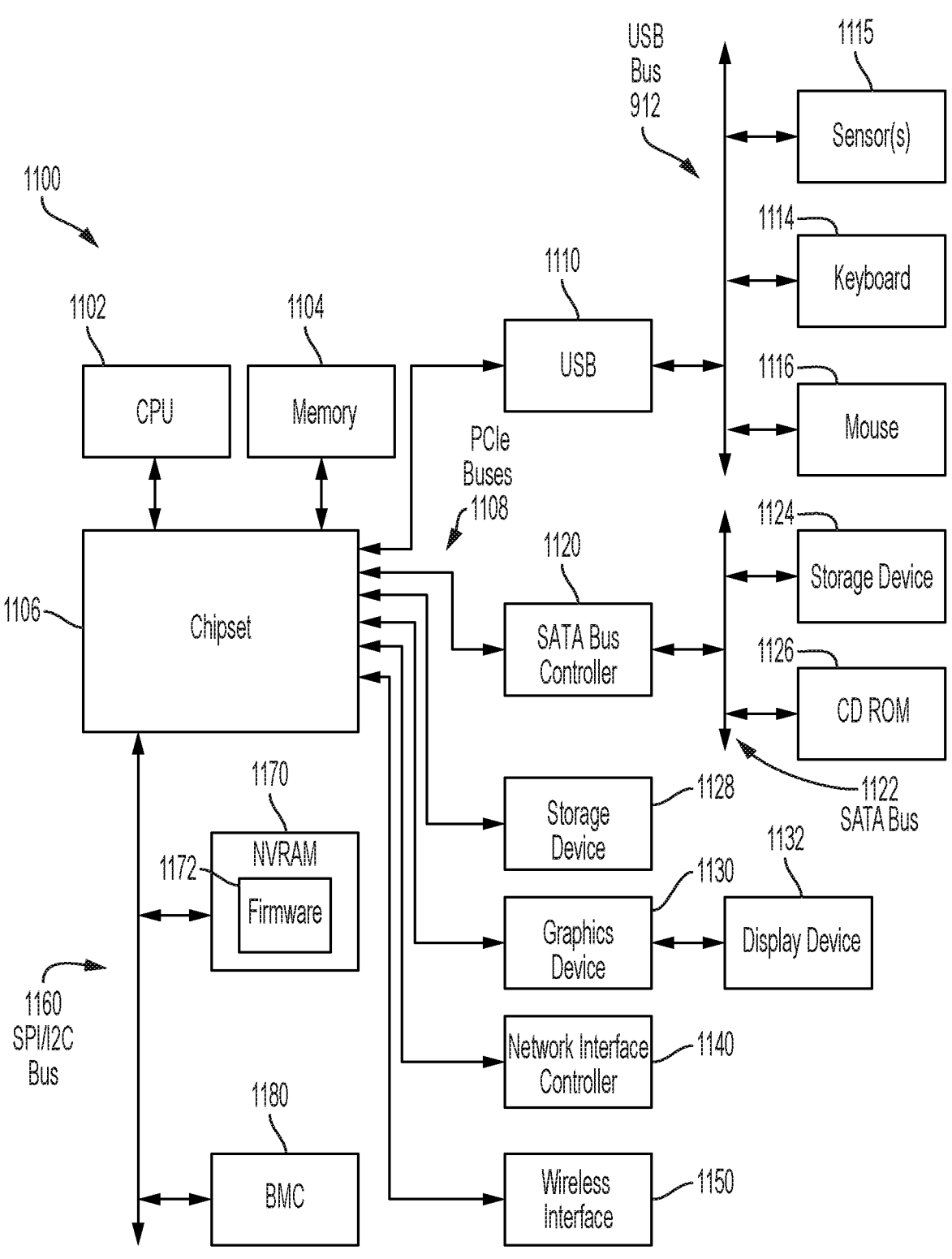
FIG. 11 is a schematic block diagram of an example information handling system according to some embodiments of the disclosure.

FIG. 11 illustrates an example information handling system 1100. Information handling system 1100 may include a processor 1102 (e.g., a central processing unit (CPU)), a memory (e.g., a dynamic random-access memory (DRAM)) 1104, and a chipset 1106. In some embodiments, one or more of the processor 1102, the memory 1104, and the chipset 1106 may be included on a motherboard (also referred to as a mainboard), which is a printed circuit board (PCB) with embedded conductors organized as transmission lines between the processor 1102, the memory 1104, the chipset 1106, and/or other components of the information handling system. The components may be coupled to the motherboard through packaging connections such as a pin grid array (PGA), ball grid array (BGA), land grid array (LGA), surface-mount technology, and/or through-hole technology. In some embodiments, one or more of the processor 1102, the memory 1104, the chipset 1106, and/or other components may be organized as a System on Chip (SoC).

The processor 1102 may execute program code by accessing instructions loaded into memory 1104 from a storage device, executing the instructions to operate on data also loaded into memory 1104 from a storage device, and generate output data that is stored back into memory 1104 or sent to another component. The processor 1102 may include processing cores capable of implementing any of a variety of instruction set architectures (ISAs), such as the x86, POWERPC®, ARM®, SPARC®, or MIPS® ISAs, or any other suitable ISA. In multi-processor systems, each of the processors 1102 may commonly, but not necessarily, implement the same ISA. In some embodiments, multiple processors may each have different configurations such as when multiple processors are present in a big-little hybrid configuration with some high-performance processing cores and some high-efficiency processing cores. The chipset 1106 may facilitate the transfer of data between the processor 1102, the memory 1104, and other components. In some embodiments, chipset 1106 may include two or more integrated circuits (ICs), such as a northbridge controller coupled to the processor 1102, the memory 1104, and a southbridge controller, with the southbridge controller coupled to the other components such as USB 1110, SATA 1120, and PCIe buses 1108. The chipset 1106 may couple to other components through one or more PCIe buses 1108.

Some components may be coupled to one bus line of the PCIe buses 1108, whereas some components may be coupled to more than one bus line of the PCIe buses 1108. One example component is a universal serial bus (USB) controller 1110, which interfaces the chipset 1106 to a USB bus 1112. A USB bus 1112 may couple input/output components such as a keyboard 1114 and a mouse 1116, but also other components such as USB flash drives, or another information handling system. Another example component is a SATA bus controller 1120, which couples the chipset

1106 to a SATA bus 1122. The SATA bus 1122 may facilitate efficient transfer of data between the chipset 1106 and components coupled to the chipset 1106 and a storage device 1124 (e.g., a hard disk drive (HDD) or solid-state disk drive (SDD)) and/or a compact disc read-only memory (CD-ROM) 1126. The PCIe bus 1108 may also couple the chipset 1106 directly to a storage device 1128 (e.g., a solid-state disk drive (SDD)). A further example of an example component is a graphics device 1130 (e.g., a graphics processing unit (GPU)) for generating output to a display device 1132, a network interface controller (NIC) 1140, and/or a wireless interface 1150 (e.g., a wireless local area network (WLAN) or wireless wide area network (WWAN) device) such as a Wi-Fi® network interface, a Bluetooth® network interface, a GSM® network interface, a 3G network interface, a 4G LTE® network interface, and/or a 5G NR network interface (including sub-6 GHz and/or mmWave interfaces).

The chipset 1106 may also be coupled to a serial peripheral interface (SPI) and/or Inter-Integrated Circuit (I2C) bus 1160, which couples the chipset 1106 to system management components. For example, a non-volatile random-access memory (NVRAM) 1170 for storing firmware 1172 may be coupled to the bus 1160. As another example, a controller, such as a baseboard management controller (BMC) 1180, may be coupled to the chipset 1106 through the bus 1160. BMC 1180 may be referred to as a service processor or embedded controller (EC). Capabilities and functions provided by BMC 1180 may vary considerably based on the type of information handling system. For example, the term baseboard management system may be used to describe an embedded processor included at a server, while an embedded controller may be found in a consumer-level device. As disclosed herein, BMC 1180 represents a processing device different from processor 1102, which provides various management functions for information handling system 1100. For example, an embedded controller may be responsible for power management, cooling management, and the like. An embedded controller included at a data storage system may be referred to as a storage enclosure processor or a chassis processor.

System 1100 may include additional processors that are configured to provide localized or specific control functions, such as a battery management controller. Bus 1160 can include one or more busses, including a Serial Peripheral Interface (SPI) bus, an Inter-Integrated Circuit (I2C) bus, a system management bus (SMBUS), a power management bus (PMBUS), or the like. BMC 1180 may be configured to provide out-of-band access to devices at information handling system 1100. Out-of-band access in the context of the bus 1160 may refer to operations performed prior to execution of firmware 1172 by processor 1102 to initialize operation of system 1100.

Firmware 1172 may include instructions executable by processor 1102 to initialize and test the hardware components of system 1100. For example, the instructions may cause the processor 1102 to execute a power-on self-test (POST). The instructions may further cause the processor 1102 to load a boot loader or an operating system (OS) from a mass storage device. Firmware 1172 additionally may provide an abstraction layer for the hardware, such as a consistent way for application programs and operating systems to interact with the keyboard, display, and other input/output devices. When power is first applied to information handling system 1100, the system may begin a sequence of initialization procedures, such as a boot procedure or a secure boot procedure. During the initialization sequence, also referred to as a boot sequence, components of system 1100 may be configured and enabled for operation and device drivers may be installed. Device drivers may provide an interface through which other components of the system 1100 can communicate with a corresponding device. The firmware 1172 may include a basic input-output system (BIOS) and/or include a unified extensible firmware interface (UEFI). Firmware 1172 may also include one or more firmware modules of the information handling system. Additionally, configuration settings for the firmware 1172 and firmware of the information handling system 1100 may be stored in the NVRAM 1170. NVRAM 1170 may, for example, be a non-volatile firmware memory of the information handling system 1100 and may store a firmware memory map namespace 1100 of the information handling system. NVRAM 1170 may further store one or more container-specific firmware memory map namespaces for one or more containers concurrently executed by the information handling system.

Information handling system 1100 may include additional components and additional busses, not shown for clarity. For example, system 1100 may include multiple processor cores (either within processor 1102 or separately coupled to the chipset 1106 or through the PCIe buses 1108), audio devices (such as may be coupled to the chipset 1106 through one of the PCIe busses 1108), or the like. While a particular arrangement of bus technologies and interconnections is illustrated for the purpose of example, one of skill will appreciate that the techniques disclosed herein are applicable to other system architectures. System 1100 may include multiple processors and/or redundant bus controllers. In some embodiments, one or more components may be integrated together in an integrated circuit (IC), which is circuitry built on a common substrate. For example, portions of chipset 1106 can be integrated within processor 1102. Additional components of information handling system 1100 may include one or more storage devices that may store machine-executable code, one or more communications ports for communicating with external devices, and various input and output (I/O) devices, such as a keyboard, a mouse, and a video display.

In some embodiments, processor 1102 may include multiple processors, such as multiple processing cores for parallel processing by the information handling system 1100. For example, the information handling system 1100 may include a server comprising multiple processors for parallel processing. In some embodiments, the information handling system 1100 may support virtual machine (VM) operation, with multiple virtualized instances of one or more operating systems executed in parallel by the information handling system 1100. For example, resources, such as processors or processing cores of the information handling system may be assigned to multiple containerized instances of one or more operating systems of the information handling system 1100 executed in parallel. A container may, for example, be a virtual machine executed by the information handling system 1100 for execution of an instance of an operating system by the information handling system 1100. Thus, for example, multiple users may remotely connect to the information handling system 1100, such as in a cloud computing configuration, to utilize resources of the information handling system 1100, such as memory, processors, and other hardware, firmware, and software capabilities of the information handling system 1100. Parallel execution of multiple containers by the information handling system 1100 may allow the information handling system 1100 to execute tasks for multiple users in parallel secure virtual environments.

The schematic or flow diagram of FIG. 7 is generally set forth as a logical flow chart diagram, as well as some of the operations described with reference to other drawings, such as FIG. 6. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Machine learning models, as described herein, may include logistic regression techniques, linear discriminant analysis, linear regression analysis, artificial neural networks, machine learning classifier algorithms, or classification/regression trees in some embodiments. In various other embodiments, machine learning systems may employ Naive Bayes predictive modeling analysis of several varieties, learning vector quantization artificial neural network algorithms, or implementation of boosting algorithms such as adaptive boosting (AdaBoost) or stochastic gradient boosting systems for iteratively updating weighting to train a machine learning classifier to determine a relationship between an influencing attribute, such as received device data, and a system, such as an environment or particular user, and/or a degree to which such an influencing attribute affects the outcome of such a system or determination of environment.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processors are described throughout the detailed description, aspects of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method comprising:
   receiving, by a hub device, first telemetry data associated with a user during a gaming session for a gaming application executing on the hub device, wherein the first telemetry data comprises first in-game telemetry data collected regarding the user during the gaming session;
   training an artificial intelligence model using first input data comprising user input data, gameplay history, household data, and biometric data;
   monitoring, using the trained artificial intelligence model, a first wellness level of the user during the gaming session, based, at least in part, on the first telemetry data;
   determining, using the trained artificial intelligence model, that the user needs wellness assistance during a portion of the gaming session, based on the monitoring; and
   initiating a wellness assistance session to provide the wellness assistance via at least one interface of a device associated with the hub device;
   receiving, by the hub device, second telemetry data associated with the user during a second gaming session for the gaming application executing on the hub device, wherein the second telemetry data comprises second in-game telemetry data collected regarding the user during the second gaming session;
   monitoring, using the trained artificial intelligence model, a second wellness level of the user during the second gaming session, based at least in part upon the second telemetry data;
   determining, using the trained artificial intelligence model, that the second wellness level is different to the first wellness level; and
   in response to determining that the second wellness level is different to the first wellness level, generating user feedback based on one or more differences between the first wellness level and the second wellness level.

2. The method of claim 1, wherein the first telemetry data includes session data and biometric data associated with the user, wherein the session data is indicative of one or more gaming characteristics of the user during the gaming session, and wherein the biometric data is indicative of a stress level of the user during the gaming session.

3. The method of claim 2, wherein the session data indicates that an age of the user is below a minimum threshold age, wherein the first telemetry data further includes relationship data identifying one or more designated contacts related to the user, and wherein initiating the wellness assistance session comprises transmitting a recommendation for the wellness assistance to one or more corresponding devices of the one or more designated contacts.

4. The method of claim 2, wherein determining that the user needs the wellness assistance comprises:
   determining, using the trained artificial intelligence model, whether the stress level of the user is above a threshold stress level; and
   determining, using the trained artificial intelligence model, that the user needs the wellness assistance when the stress level of the user is above the threshold stress level during the portion of the gaming session.

5. The method of claim 4, wherein the threshold stress level is based on an average stress level of other users associated with the gaming application.

6. The method of claim 1, wherein the at least one interface of the device associated with the user includes a display interface of a display device coupled to the hub device, and wherein initiating the wellness assistance session comprises:
   displaying a prompt via the display interface of the display device, the prompt requesting confirmation that the user needs the wellness assistance during the gaming session;
   receiving a response to the prompt from the device of the user; and
   initiating the wellness assistance session as an in-game assistance session via the display interface when the response includes the requested confirmation.

7. The method of claim 6, wherein the at least one interface of the device associated with the user further includes a haptic interface of a peripheral device coupled to the hub device, and wherein initiating the wellness assistance session further comprises triggering haptic feedback via the haptic interface of the peripheral device based on the received response.

8. The method of claim 7, wherein the peripheral device is a wireless game controller coupled to the hub device.

9. An information handling system comprising:
   a memory; and
   a processor coupled to the memory, wherein the processor is configured to perform operations comprising:
      receiving first telemetry data associated with a user during a gaming session for a gaming application, wherein the first telemetry data comprises first in-game telemetry data collected regarding the user during the gaming session;
      training an artificial intelligence model using first input data comprising user input data, gameplay history, household data, and biometric data;
      monitoring, using the trained artificial intelligence model, a first wellness level of the user during the gaming session, based, at least in part, on the first telemetry data;

determining, using the trained artificial intelligence model, that the user needs wellness assistance during a portion of the gaming session, based on the monitoring; and initiating a wellness assistance session to provide the wellness assistance via at least one interface of a device associated with the user;

receiving second telemetry data associated with the user during a second gaming session for the gaming application, wherein the second telemetry data comprises second in-game telemetry data collected regarding the user during the second gaming session;

monitoring, using the trained artificial intelligence model, a second wellness level of the user during the second gaming session, based at least in part upon the second telemetry data;

determining, using the trained artificial intelligence model, that the second wellness level is different to the first wellness level; and in response to determining that the second wellness level is different to the first wellness level, generating user feedback based on one or more differences between the first wellness level and the second wellness level.

10. The information handling system of claim 9, wherein the first telemetry data includes session data and biometric data associated with the user, wherein the session data is indicative of one or more gaming characteristics of the user during the gaming session, and wherein the biometric data is indicative of a stress level of the user during the gaming session.

11. The information handling system of claim 10, wherein the session data indicates that an age of the user is below a minimum threshold age, wherein the first telemetry data further includes relationship data identifying one or more designated contacts related to the user, and wherein initiating the wellness assistance session comprises transmitting a recommendation for the wellness assistance to one or more corresponding devices of the one or more designated contacts.

12. The information handling system of claim 10, wherein determining that the user needs the wellness assistance comprises:

determining, using the trained artificial intelligence model, whether the stress level of the user is above a threshold stress level; and determining, using the trained artificial intelligence model, that the user needs the wellness assistance when the stress level of the user is above the threshold stress level during the portion of the gaming session.

13. The information handling system of claim 12, wherein the threshold stress level is based on an average stress level of other users associated with the gaming application.

14. The information handling system of claim 9, wherein the at least one interface of the device associated with the user includes a display interface of a display device, and wherein initiating the wellness assistance session comprises:

displaying a prompt via the display interface of the display device, the prompt requesting confirmation that the user needs the wellness assistance during the gaming session;

receiving a response to the prompt from the device of the user; and initiating the wellness assistance session as an in-game assistance session via the display interface when the response includes the requested confirmation.

15. The information handling system of claim 14, wherein the at least one interface of the device associated with the user further includes a haptic interface of a peripheral device associated with the user, and wherein initiating the wellness assistance session further comprises triggering haptic feedback via the haptic interface of the peripheral device based on the received response.

16. The information handling system of claim 15, wherein the peripheral device is a wireless game controller.

17. A computer program product comprising:

a non-transitory computer readable medium comprising code for performing operations comprising:

receiving first telemetry data associated with a user during a gaming session for a gaming application, wherein the first telemetry data comprises first in-game telemetry data collected regarding the user during the gaming session;

training an artificial intelligence model using first input data comprising user input data, gameplay history, household data, and biometric data;

monitoring a first wellness level of the user during the gaming session, based, at least in part, on the first telemetry data;

determining that the user needs wellness assistance during a portion of the gaming session, based on the monitoring; and initiating a wellness assistance session to provide the wellness assistance via at least one interface of a device associated with the user;

receiving second telemetry data associated with the user during a second gaming session for the gaming application, wherein the second telemetry data comprises second in-game telemetry data collected regarding the user during the second gaming session;

monitoring, using the trained artificial intelligence model, a second wellness level of the user during the second gaming session, based at least in part upon the second telemetry data;

determining, using the trained artificial intelligence model, that the second wellness level is different to the first wellness level; and in response to determining that the second wellness level is different to the first wellness level, generating user feedback based on one or more differences between the first wellness level and the second wellness level.

18. The computer program product of claim 17, wherein the first telemetry data includes session data and biometric data associated with the user, wherein the session data is indicative of one or more gaming characteristics of the user during the gaming session, and wherein the biometric data is indicative of a stress level of the user during the gaming session.

19. The computer program product of claim 18, wherein the session data indicates that an age of the user is below a minimum threshold age, wherein the first telemetry data further includes relationship data identifying one or more designated contacts related to the user, and wherein initiating the wellness assistance session comprises transmitting a recommendation for the wellness assistance to one or more corresponding devices of the one or more designated contacts.

20. The computer program product of claim 18, wherein determining that the user needs the wellness assistance comprises:

determining, using the trained artificial intelligence model, whether the stress level of the user is above a threshold stress level; and determining, using the trained artificial intelligence model, that the user needs the wellness assistance when the stress level of the user is above the threshold stress level during the portion of the gaming session.

* * * * *